US010175860B2

(12) United States Patent
Marantz et al.

(10) Patent No.: US 10,175,860 B2
(45) Date of Patent: Jan. 8, 2019

(54) SEARCH INTENT PREVIEW, DISAMBIGUATION, AND REFINEMENT

(71) Applicant: Microsoft Corporation, Redmond, WA (US)

(72) Inventors: Daniel Marantz, Bellevue, WA (US); Aaron Chun Win Yuen, Bellevue, WA (US); Guarang P. Prajapati, Redmond, WA (US); Parthasarathy Govindarajen, Bothell, WA (US); Kuansan Wang, Bellevue, WA (US); Yu-Ting Kuo, Sammamish, WA (US); Arun Kumar Sacheti, Redmond, WA (US); Yin-Cheng Ting, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 613 days.

(21) Appl. No.: 13/911,844

(22) Filed: Jun. 6, 2013

(65) Prior Publication Data
US 2014/0280092 A1    Sep. 18, 2014

(51) Int. Cl.
*G06F 17/30* (2006.01)
*G06F 3/0484* (2013.01)
*G06Q 30/02* (2012.01)

(52) U.S. Cl.
CPC ........ *G06F 3/0484* (2013.01); *G06F 17/3097* (2013.01); *G06F 17/30864* (2013.01); *G06Q 30/0269* (2013.01)

(58) Field of Classification Search
CPC ......... G06F 17/30867; G06F 17/30675; G06F 17/30696; G06F 3/0484; G06F 17/3097;
(Continued)

(56) References Cited

U.S. PATENT DOCUMENTS 6,564,213 B1    5/2003 Ortega et al.
7,332,748 B2    2/2008 Kodama et al.
(Continued)

FOREIGN PATENT DOCUMENTS

CN    102915342 A    2/2013

OTHER PUBLICATIONS

Non-Final Office Action dated Feb. 11, 2015 in U.S. Appl. No. 13/839,395, 22 pages.
(Continued)

*Primary Examiner* — Scott A. Waldron
*Assistant Examiner* — Andalib F Lodhi
(74) *Attorney, Agent, or Firm* — Shook, Hardy & Bacon L.L.P.

(57) ABSTRACT

Systems, methods, computer storage media, and user interfaces are provided for non-committal intent preview, disambiguation, and refinement of a search. A search prefix comprising one or more characters associated with an unexecuted search query is received. One or more intent suggestions are suggested to a user. For each of the one or more intent suggestions, one or more entity identifications associated with each of the one or more intent suggestions are received. Metadata corresponding to at least one entity associated with the one or more entity identifications is retrieved from an entity data store. Without retrieving search results for the unexecuted search query, an aggregated intent preview based on the retrieved metadata corresponding to the at least one entity is provided.

19 Claims, 13 Drawing Sheets

(58) Field of Classification Search
CPC .............. G06F 17/30864; G06Q 30/02; G06Q 30/0269
USPC ........................................................ 707/723
See application file for complete search history.

(56) References Cited

U.S. PATENT DOCUMENTS

| | | | |
|---|---|---|---|
| 7,603,360 B2 | 10/2009 | Ramer et al. | |
| 7,979,415 B2 | 7/2011 | Shen et al. | |
| 8,027,990 B1 | 9/2011 | Mysen et al. | |
| 8,050,675 B2 | 11/2011 | Ramer et al. | |
| 8,082,278 B2 | 12/2011 | Agrawal et al. | |
| 8,108,778 B2* | 1/2012 | Athsani | H04M 1/72522 715/738 |
| 8,117,208 B2* | 2/2012 | Chang | G06F 17/30867 707/748 |
| 8,135,616 B2 | 3/2012 | Callaghan et al. | |
| 8,135,721 B2 | 3/2012 | Joshi et al. | |
| 8,204,897 B1 | 6/2012 | Djabarov et al. | |
| 8,209,344 B2 | 6/2012 | Ramer et al. | |
| 8,326,859 B2 | 12/2012 | Paek et al. | |
| 8,332,748 B1 | 12/2012 | Karam | |
| 8,341,157 B2 | 12/2012 | Schulman | |
| 8,601,019 B1 | 12/2013 | Weininger et al. | |
| 8,631,004 B2 | 1/2014 | Mishne et al. | |
| 8,639,684 B2 | 1/2014 | Djabarov | |
| 8,671,106 B1 | 3/2014 | Lee et al. | |
| 8,799,276 B1 | 8/2014 | Hyatt et al. | |
| 9,092,527 B2* | 7/2015 | Shapira | G06F 17/30864 |
| 9,244,985 B1 | 1/2016 | Haugen et al. | |
| 9,355,140 B1* | 5/2016 | Bousquet | G06F 17/30038 |
| 9,489,458 B1 | 11/2016 | Haugen et al. | |
| 2006/0064411 A1 | 3/2006 | Gross et al. | |
| 2006/0173825 A1 | 8/2006 | Hess et al. | |
| 2006/0242586 A1 | 10/2006 | McGlinchey et al. | |
| 2006/0288015 A1 | 12/2006 | Schirripa et al. | |
| 2007/0050251 A1 | 3/2007 | Jain et al. | |
| 2007/0100650 A1 | 5/2007 | Ramer et al. | |
| 2007/0185847 A1 | 8/2007 | Budzik et al. | |
| 2007/0294240 A1 | 12/2007 | Steele et al. | |
| 2008/0022216 A1 | 1/2008 | Duval | |
| 2008/0104037 A1 | 5/2008 | Bierner | |
| 2008/0109491 A1 | 5/2008 | Gupta | |
| 2008/0154859 A1 | 6/2008 | Chi et al. | |
| 2008/0172374 A1 | 7/2008 | Wolosin et al. | |
| 2009/0019002 A1 | 1/2009 | Boulis | |
| 2009/0106224 A1 | 4/2009 | Roulland et al. | |
| 2009/0112848 A1 | 4/2009 | Kunjithapatham et al. | |
| 2009/0177744 A1 | 7/2009 | Marlow et al. | |
| 2009/0271390 A1 | 10/2009 | Zheng et al. | |
| 2009/0313100 A1 | 12/2009 | Ingleshwar | |
| 2010/0010959 A1 | 1/2010 | Broder et al. | |
| 2010/0057698 A1 | 3/2010 | Prasad Kantamneni et al. | |
| 2010/0146012 A1 | 6/2010 | Beaudreau et al. | |
| 2010/0169364 A1 | 7/2010 | Hardt | |
| 2010/0180001 A1 | 7/2010 | Hardt | |
| 2010/0205202 A1 | 8/2010 | Yang et al. | |
| 2010/0312782 A1 | 12/2010 | Li et al. | |
| 2011/0035397 A1 | 2/2011 | Joshi et al. | |
| 2011/0087686 A1 | 4/2011 | Brewer et al. | |
| 2011/0093488 A1 | 4/2011 | Amacker et al. | |
| 2011/0107242 A1 | 5/2011 | Paek et al. | |
| 2011/0161311 A1 | 6/2011 | Mishne et al. | |
| 2011/0184981 A1 | 7/2011 | Lu et al. | |
| 2011/0191364 A1 | 8/2011 | Lebeau et al. | |
| 2011/0202520 A1* | 8/2011 | Teran | G06F 17/30973 707/708 |
| 2011/0218862 A1 | 9/2011 | Langston et al. | |
| 2011/0225155 A1* | 9/2011 | Roulland | G06F 17/30598 707/737 |
| 2011/0264648 A1 | 10/2011 | Gulik et al. | |
| 2011/0295952 A1 | 12/2011 | Buyukkokten et al. | |
| 2011/0320423 A1* | 12/2011 | Gemmell | G06F 17/30867 707/706 |
| 2012/0005201 A1 | 1/2012 | Ebanks | |
| 2012/0059838 A1 | 3/2012 | Berntson et al. | |
| 2012/0084291 A1 | 4/2012 | Chung et al. | |
| 2012/0123857 A1 | 5/2012 | Surve et al. | |
| 2012/0131032 A1 | 5/2012 | Rakshit | |
| 2012/0144317 A1 | 6/2012 | Balasubramanian et al. | |
| 2012/0158461 A1* | 6/2012 | Aldrey | G06Q 30/0201 705/7.35 |
| 2012/0197837 A1 | 8/2012 | Badros et al. | |
| 2012/0246165 A1 | 9/2012 | Batraski et al. | |
| 2012/0265647 A1 | 10/2012 | Negrillo et al. | |
| 2012/0265779 A1 | 10/2012 | Hsu et al. | |
| 2012/0265787 A1 | 10/2012 | Hsu et al. | |
| 2012/0284253 A9 | 11/2012 | Ghosh et al. | |
| 2012/0296734 A1 | 11/2012 | Shaw et al. | |
| 2012/0296743 A1 | 11/2012 | Velipasaoglu et al. | |
| 2012/0316955 A1 | 12/2012 | Panguluri et al. | |
| 2012/0323828 A1 | 12/2012 | Sontag et al. | |
| 2013/0036109 A1 | 2/2013 | Kulick et al. | |
| 2013/0275456 A1 | 10/2013 | Cheng et al. | |
| 2013/0282749 A1 | 10/2013 | Batraski et al. | |
| 2014/0149932 A1 | 5/2014 | Wilder et al. | |
| 2014/0156262 A1* | 6/2014 | Yuen | G06F 17/30675 704/9 |
| 2014/0280015 A1 | 9/2014 | Marantz et al. | |
| 2014/0282136 A1 | 9/2014 | Marantz et al. | |

OTHER PUBLICATIONS

"International Search Report & Written Opinion for PCT Patent Application No. PCT/CN2013/072599", dated Dec. 19, 2013, Filed Date: Mar. 14, 2013, 13 Pages.
"International Search Report & Written Opinion for PCT Patent Application No. PCT/US2014/028993", dated Sep. 25, 2014, 8 Pages.
"Using Auto-Suggest", Retrieved on: Mar. 7, 2013, Available at: http://help.yahoo.com/l/us/yahoo/smallbusiness/store/promote/tools/tools-54.html.
Pitler, et al., "Using Word-Sense Disambiguation Methods to Classify Web Queries by Intent", In Proceedings of the Conference on Empirical Methods in Natural Language Processing, Aug. 6, 2009, 9 pages.
Osterhoff, et al., "Widen the Peepholes! Entity-based Auto-suggestion as a Rich and Yet Immediate Starting Point for Exploratory Search", In Proceedings of 2nd Workshop on Interaction and Visualization in Data Web, Sep. 2012, 8 pages.
"Keywords Are Dead! Long Live User Intent!", Published on: Jan. 8, 2013, Available at: http://searchenginewatch.com/article/2234448/Keywords-Are-Dead-Long-Live-User-Intent.
U.S. Appl. No. 13/221,026, Govani, et al., Adding Social Network Data to Search Suggestions, filed Aug. 8, 2011.
U.S. Appl. No. 13/311,869, Schechter, et al., Social Network Powered Query Suggestions, filed Dec. 6, 2011.
Tsai, et al., "Improving Query Suggestion by Utilizing User Intent", In IEEE International Conference on Information Reuse and Integration, Aug. 4, 2010, 6 pages.
International Search Report with Written Opinion dated Nov. 19, 2014 in Application No. PCT/US2014/028318, 10 pages.
Final Office Action dated Aug. 13, 2015 in U.S. Appl. No. 13/904,887, 22 pages.
International Preliminary Report on Patentability dated Sep. 24, 2015 in Application No. PCT/CN/2013/072599, 9 pages.
Non-Final Office Action dated Apr. 21, 2016 in U.S. Appl. No. 13/904,887, 29 pages.
Final Office Action dated Aug. 25, 2016 in U.S. Appl. No. 13/904,887, 25 pages.
"Supplementary Search Report Issued in European Patent Application No. 14717618.4", dated Aug. 2, 2016, 9 Pages.
Non-Final Office Action dated Mar. 8, 2017 in U.S. Appl. No. 13/904,887, 30 pages.
Final Office Action dated Aug. 14, 2017 in U.S. Appl. No. 13/904,887, 25 pages.
"Guide to Software Release 6.8", Available at: http://web.archive.org/web/20130118092548/https://developers.google.com/search-appliance/documentation/68/NewFeatures, Oct. 2010, 6 Pages.

(56) References Cited

OTHER PUBLICATIONS

"Office Action and Search Report Issued in Taiwan Patent Application No. 103107639", dated Apr. 26, 2017, 9 Pages.
"Non Final Office Action Issued in U.S. Appl. No. 13/904,887", dated Mar. 12, 2015, 19 Pages.
"Final Office Action Issued in U.S. Appl. No. 13/917,260", dated Aug. 26, 2016, 39 Pages.
"Final Office Action Issued in U.S. Appl. No. 13/917,260", dated Sep. 28, 2017, 34 Pages.
"Final Office Action Issued in U.S. Appl. No. 13/917,260", dated Jul. 29, 2015, 30 Pages.
"Non Final Office Action Issued in U.S. Appl. No. 13/917,260", dated Feb. 26, 2015, 30 Pages.
"Non Final Office Action Issued in U.S. Appl. No. 13/917,260", dated May 17, 2017, 40 Pages.
"Non Final Office Action Received for U.S. Appl. No. 13/917,260", dated Apr. 20, 2016, 32 Pages.
"Office Action Issued in European Patent Application No. 14717618.4", dated Oct. 20, 2017, 8 Pages.
"Office Action Issued in European Patent Application No. 14720831.8", dated Oct. 20, 2017, 5 Pages.
"Search Report Issued in European Patent Application No. 14720831.8", dated Aug. 2, 2016, 9 Pages.
"Office Action Issued in Chinese Patent Application No. 201480015031.2", dated Jan. 2, 2018, 13 Pages.
Beld, Bas Van Den, "Google Using Knowledge Graph on People Search", Retrieved From : http://www.stateofdigital.com/google-using-knowledge-graph-on-people-search/, Jul. 17, 2012, 2 Pages.
Constine, Josh, "Why Google+ Doesn't Care If You Never Come Back", Retrieved From: https://techcrunch.com/2012/02/28/no-more-no-more-no-more-no-more/, Feb. 29, 2012, 2 Pages.
Harrison, "Spokeo 5.0 Sneak Preview", Retrieved From: https://www.spokeo.com/compass/spokeo-5-sneak-preview/, Nov. 10, 2010, 3 Pages.
Hennkens, Chris, "Facebook Announces Graph Search Preview", Retrieved From: http://resolutionmedia.com/us/en/facebook-announces-graph-search/, Feb. 21, 2013, 4 Pages.
Marantz, Daniel, et al., "Search Intent Preview and Disambiguation UI Model for Search.", PCT Application No. PCT/CN2013/072599, dated Mar. 14, 2013, 54 pages.
Martinez-Romo, et al., "Web People Search Disambiguation using Language Model Techniques", In Proceedings of 18th International World Wide Web Conference, Apr. 20, 2009, 5 Pages.
"International Search Report and Written Opinion Issued in PCT Patent Application No. PCT/US2014/028554", dated Dec. 5, 2014, 8 Pages.
"International Preliminary Report on Patentability Issued in PCT Application No. PCT/US2014/028993", dated Sep. 24, 2015, 7 Pages.
Rode, et al., "Using Query Profiles for Clarification", In Proceedings of the 28th European Conference on Information Retrieval., Apr. 10, 2006, pp. 205-216.
Romer, et al., "Real-Time Search for Real-World Entities: A Survey", In Proceedings of IEEE, vol. 98, Issue 11., Nov. 2010, pp. 1887-1902.
Rowe, Matthew, "Applying Semantic Social Graphs to Disambiguate Identity References", In Proceedings of the 6th European Semantic Web Conference on the Semantic Web: Research and Applications, May 31, 2009, pp. 461-475.
Sproch, et al., "Resolving Student Entities in the Facebook Social Graph", Retrieved From: https://pdfs.semanticscholar.org/ff5c/8554e7a2942c34c76e30367ff1903e03b4f3.pdf, Apr. 26, 2013, 7 Pages.
Tan, et al., "Person Entity Attributes Association in List Pages", In Proceedings of International Conference on Computer Science and Network Technology, Dec. 24, 2011, pp. 517-521.
Yang, et al., "Query Intent Disambiguation of Keyword-Based Semantic Entity Search in Dataspaces", In Journal of Computer Science and Technology, vol. 28, Issue 2, Mar. 1, 2013, pp. 382-393.
You, et al., "SocialSearch: Enhancing Entity Search with Social Network Matching", In Proceedings of the 14th International Conference on Extending Database Technology, Mar. 21, 2011, pp. 515-519.

* cited by examiner

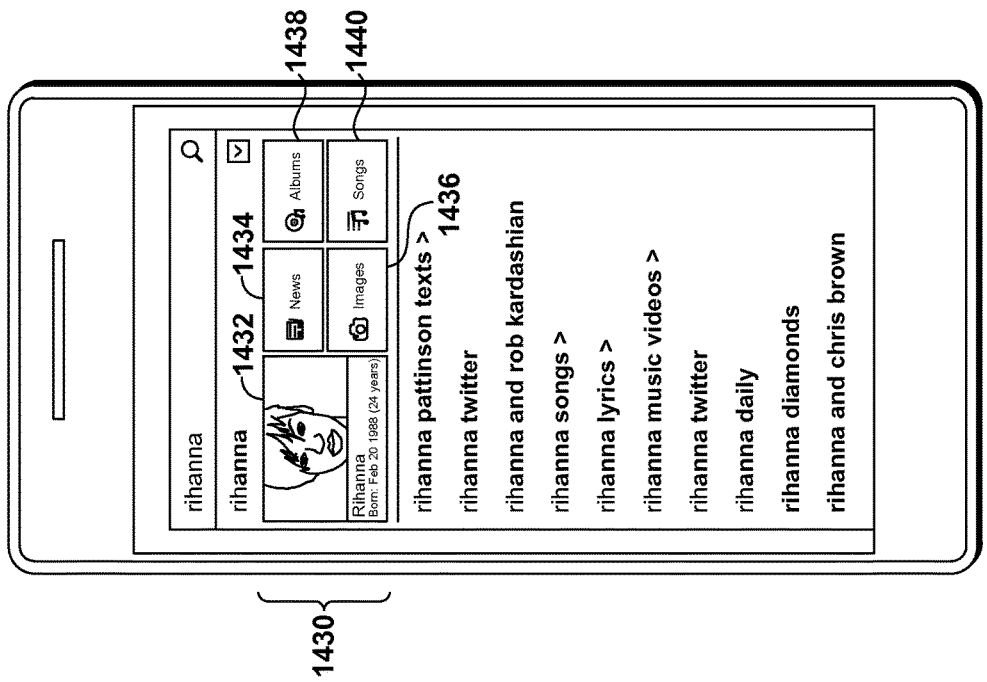
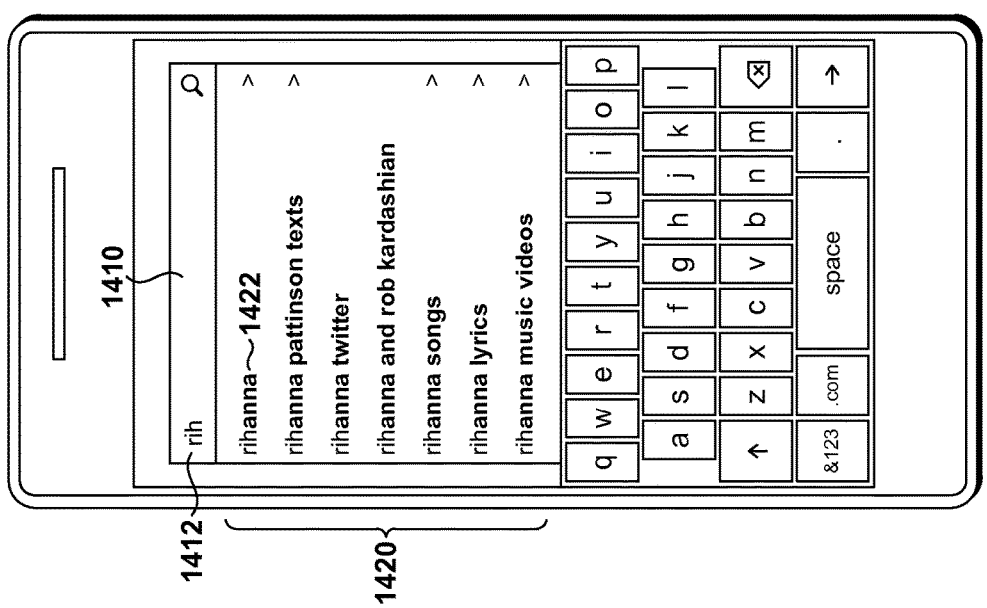
FIG. 14B
FIG. 14A

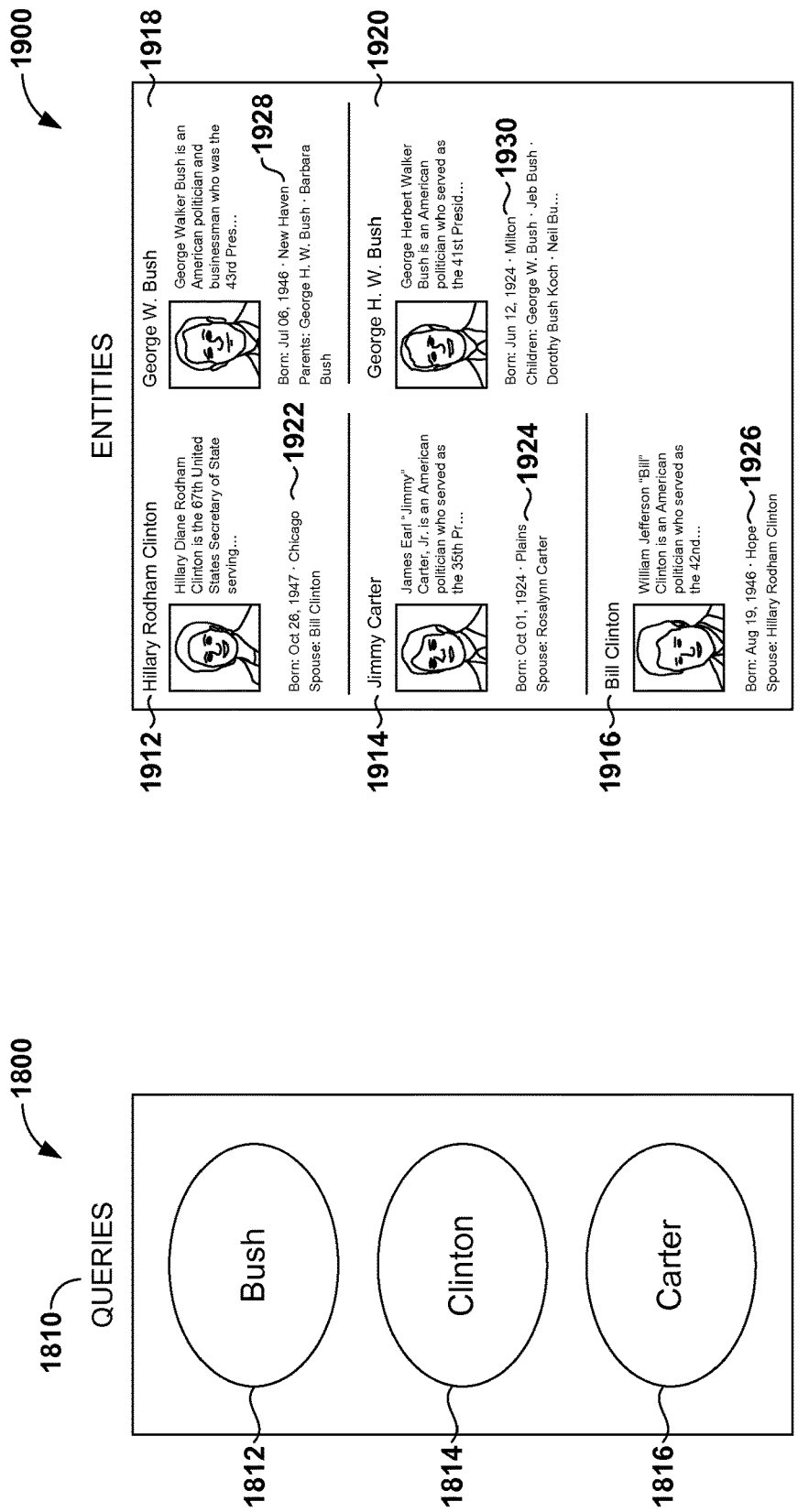

SEARCH INTENT PREVIEW, DISAMBIGUATION, AND REFINEMENT

RELATED APPLICATION

This application claims priority to International Application No. PCT/CN2013/072599, filed Mar. 14, 2013, which is incorporated herein by reference in the entirety.

BACKGROUND

Search engines and interfaces allow users to retrieve information by inputting search queries, for instance, into a search input region. While a user is inputting a search prefix associated with a search query, automatic systems provide likely completions or suggestions to the search prefix being input. When the user executes the search query, either by manually inputting the desired search query or by selecting a suggestion, the search engine directs the user to a search engine results page ("SERP").

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, computer storage media, and user interfaces are provided for non-committal intent preview, disambiguation, and refinement of a search. A search prefix comprising one or more characters associated with an unexecuted search query is received. One or more intent suggestions are suggested to a user. For each of the intent suggestions, one or more associated entity identifications are received. Metadata corresponding to at least one entity associated with the entity identifications is retrieved from an entity data store. Without retrieving search results for the unexecuted search query, an aggregated intent preview based on the retrieved metadata corresponding to the at least one entity is provided. The entities may be ranked based on entity-intrinsic signals, query-entity interactions by users, and query pattern likelihood scores. A refined intent preview associated with metadata corresponding to one or more subentities based on a selected item of metadata associated with the at least one entity may be provided. Task completion for a selected entity or subentity may be enabled. A set of queries issued by the user and entities corresponding to the set of queries may be provided. In embodiments, the entities enable the user to interact with a search history.

BRIEF DESCRIPTION OF THE DRAWINGS

The present invention is illustrated by way of example and not limitation in the accompanying figures in which like reference numerals indicate similar elements and in which:

FIGS. 4-20 depict illustrative screen displays, in accordance with exemplary embodiments of the present invention.

DETAILED DESCRIPTION

Figure 1:
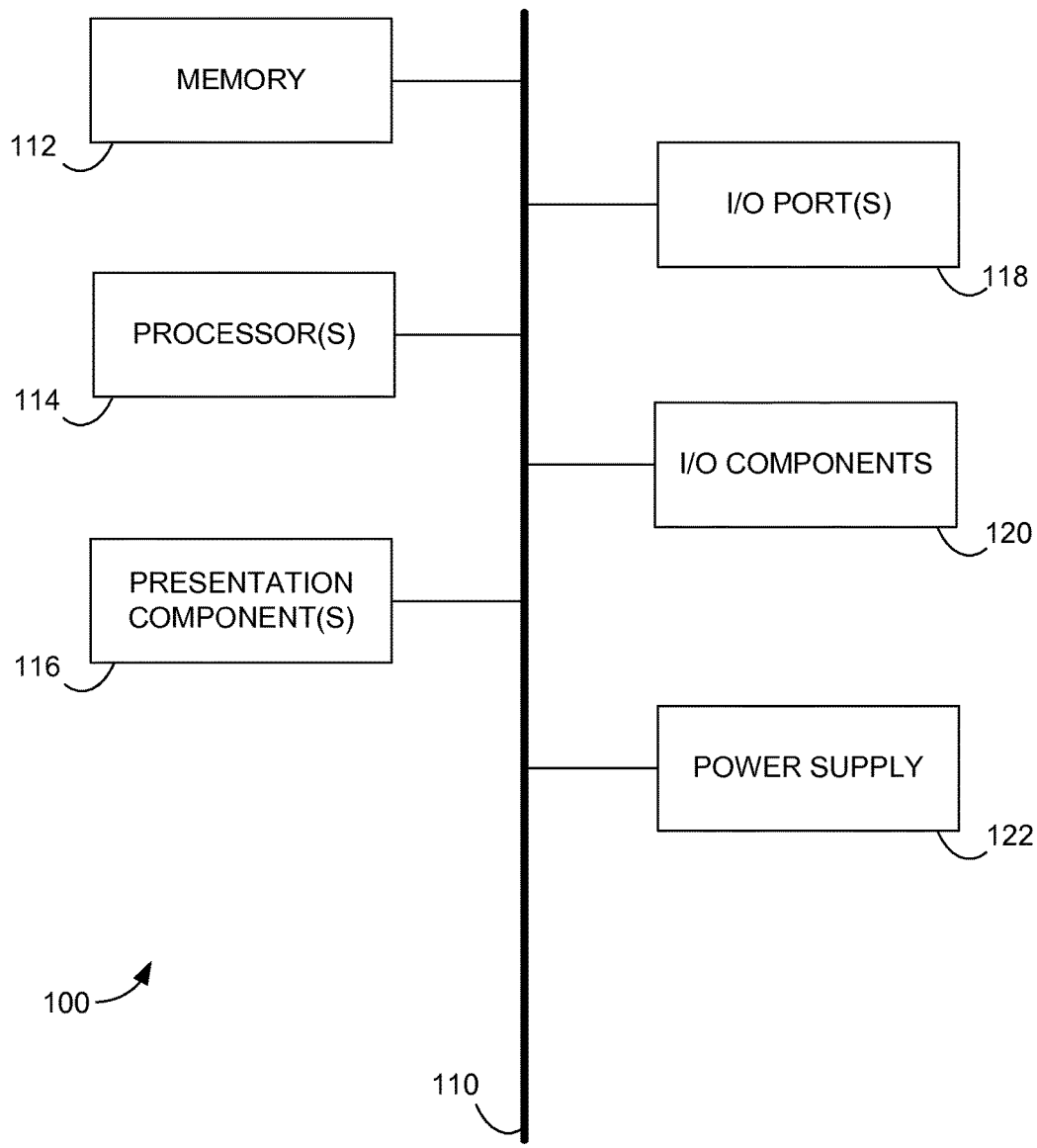
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Users are often searching for a particular entity. Entities are instances of abstract concepts and objects, including people, places, things, events, locations, businesses, movies, and the like. Depending on the search query a user inputs or selects, the SERP may or may not include information about the particular entity the user is searching for.

Existing autosuggestion systems do not address tail queries (i.e., infrequent or unseen queries) or intent the system has not encountered or otherwise ambiguous during the query formulation process. Intent refers to the target of the search, which may be an entity. Further, existing autosuggestion systems do not allow disambiguation of intent or allow users to express intent prior to retrieving the SERP. Any changes to the search query, such as selection of suggestions or input of additional characters, causes the SERP to refresh which can be distracting to the user and inefficient from a resource perspective. Still further, summarized data, such as in a search history or search session, is limited to presenting individual queries of a set. This can make it difficult for a user to ascertain the appropriate context or intent of a given session which effectively limits the ability to share the data in a meaningful way.

Various aspects of the technology described herein are generally directed to systems, methods, and computer-readable storage media for non-committal intent preview, disambiguation, and refinement of a search. A search prefix comprising one or more characters associated with an unexecuted search query is received. One or more intent suggestions are suggested to a user. For each of the one or more intent suggestions, one or more entity identifications associated with each of the one or more intent suggestions are received. Metadata corresponding to at least one entity associated with the one or more entity identifications is retrieved from an entity data store. Without retrieving search results for the unexecuted search query, an aggregated intent preview based on the retrieved metadata corresponding to the at least one entity is provided. In embodiments, the one or more entities are ranked based on entity-intrinsic signals (i.e., number of attributes associated with an entity, entity type, number of information sources associated with an entity), query-entity interactions by users (i.e., explicit interactions or clicks on an entity in a search window or third party entity repository, interactions attributed to an entity via a query-url-entity tripartite graph), and query pattern likelihood scores, populating the intent suggestions or aggregated intent preview in order of relevance or likelihood of query intent. In embodiments, a refined intent preview associated with metadata corresponding to one or more subentities based on a selected item of metadata associated with the one or more entities is provided, conserving time and resources by allowing the user to further refine intent without executing the unexecuted search query. In embodiments, task completion for a selected entity or subentity is enabled allowing the user to easily and quickly take a particular action or complete a task associated with the entity or subentity without having to execute the unexecuted search query. In other words, task completion refers to the opening and execution or completion of a task within an application, independent window, link, or process with or without affecting the search or search window. In embodiments, a set of queries issued by the user and entities corresponding to the set of queries may be provided, enabling the user to easily and quickly interact with a search history via the provided entities.

Accordingly, one embodiment of the present invention is directed to one or more computer storage media storing computer-useable instructions that, when used by one or more computing devices, cause the one or more computing devices to perform a method of non-committal intent preview, disambiguation, and refinement of a search. The method includes receiving a search prefix from a user, the search prefix comprising one or more characters associated with a search query. One or more intent suggestions are provided to the user based on a comparison of the search prefix with an autosuggest data store. One or more entity identifications associated with the intent suggestions are identified based on an entity ranking. An aggregated intent preview comprising metadata corresponding to one or more entities associated with at least one of the one or more entity identifications is provided. A refinement request is received from the user. The refinement request comprises an indication that the user has selected an item of metadata corresponding to a subentity and associated with the one or more entities. A refined intent preview comprising metadata corresponding to the subentity is provided.

Another embodiment of the present invention is directed to computer storage media having computer-executable instructions embodied thereon that, when executed by one or more computing devices, cause the one or more computing devices to produce a graphical user interface (GUI) for non-committal intent preview, disambiguation, and refinement of a search The GUI includes a search display area that displays a search bar for receiving a search prefix corresponding to an unexecuted search from a user. An autosuggest display area displays, without executing the search, one or more intent suggestions to the user. An entity display area displays, without executing the search, an aggregated intent preview comprising metadata associated with at least one entity corresponding to entity identifications associated with the one or more intent suggestions. A refinement display area displays, without executing the search, a refined intent preview comprising metadata associated with a subentity corresponding to an item of metadata selected by the user and associated with the at least one entity.

Yet another embodiment of the present invention includes a system for providing non-committal intent preview, disambiguation, and refinement of a search. The system includes one or more processors coupled to a computer storage medium, the computer storage medium having stored thereon a plurality of computer software components executable by the processor. The computer software components include an autosuggest component that receives a search prefix comprising one or more characters associated with an unexecuted search query and suggests one or more intent suggestions to a user. An entity identification component receives, for each of the one or more intent suggestions, one or more associated entity identifications. A metadata component retrieves metadata from an entity data store. The metadata corresponds to at least one entity associated with the one or more entity identifications. A preview component provides, without retrieving search results for the unexecuted search query, an aggregated intent preview based on the retrieved metadata corresponding to the at least one entity.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device,"

etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures (i.e., motion or movements associated with a user's hand or hands or other parts of the user's body), voice, or other physiological inputs generated by a user. These inputs may be interpreted as search prefixes, search requests, requests for interacting with intent suggestions, requests for interacting with entities or subentities, or requests for interacting with advertisements, entity or disambiguation tiles, actions, search histories, and the like provided by the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Aspects of the subject matter described herein may be described in the general context of computer-executable instructions, such as program modules, being executed by a computing device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "intent disambiguation engine" is used herein, it will be recognized that this term may also encompass a server, a Web browser, a set of one or more processes distributed on one or more computers, one or more stand-alone storage devices, a set of one or more other computing or storage devices, any application, process, or device capable of providing search functionality; search intent preview, disambiguation, and refinement as described herein; a combination of one or more of the above; and the like.

As previously mentioned, embodiments of the present invention are generally directed to systems, methods, and computer-readable storage media for non-committal intent preview, disambiguation, and refinement of a search. A search prefix comprising one or more characters associated with an unexecuted search query is received. One or more intent suggestions are suggested to a user. For each of the one or more intent suggestions, one or more associated entity identifications are received. Metadata corresponding to at least one entity associated with the one or more entity identifications is retrieved from an entity data store. Without retrieving search results for the unexecuted search query, an aggregated intent preview based on the retrieved metadata corresponding to the at least one entity is provided. The one or more entities may be ranked based on entity-intrinsic signals, query-entity interactions by users, and query pattern likelihood scores. A refined intent preview associated with metadata corresponding to one or more subentities based on a selected item of metadata associated with the one or more entities may be provided. Task completion for a selected entity or subentity may be enabled. A set of queries issued by the user and entities corresponding to the set of queries may be provided. In embodiments, the entities enable the user to interact with a search history.

Figure 2:
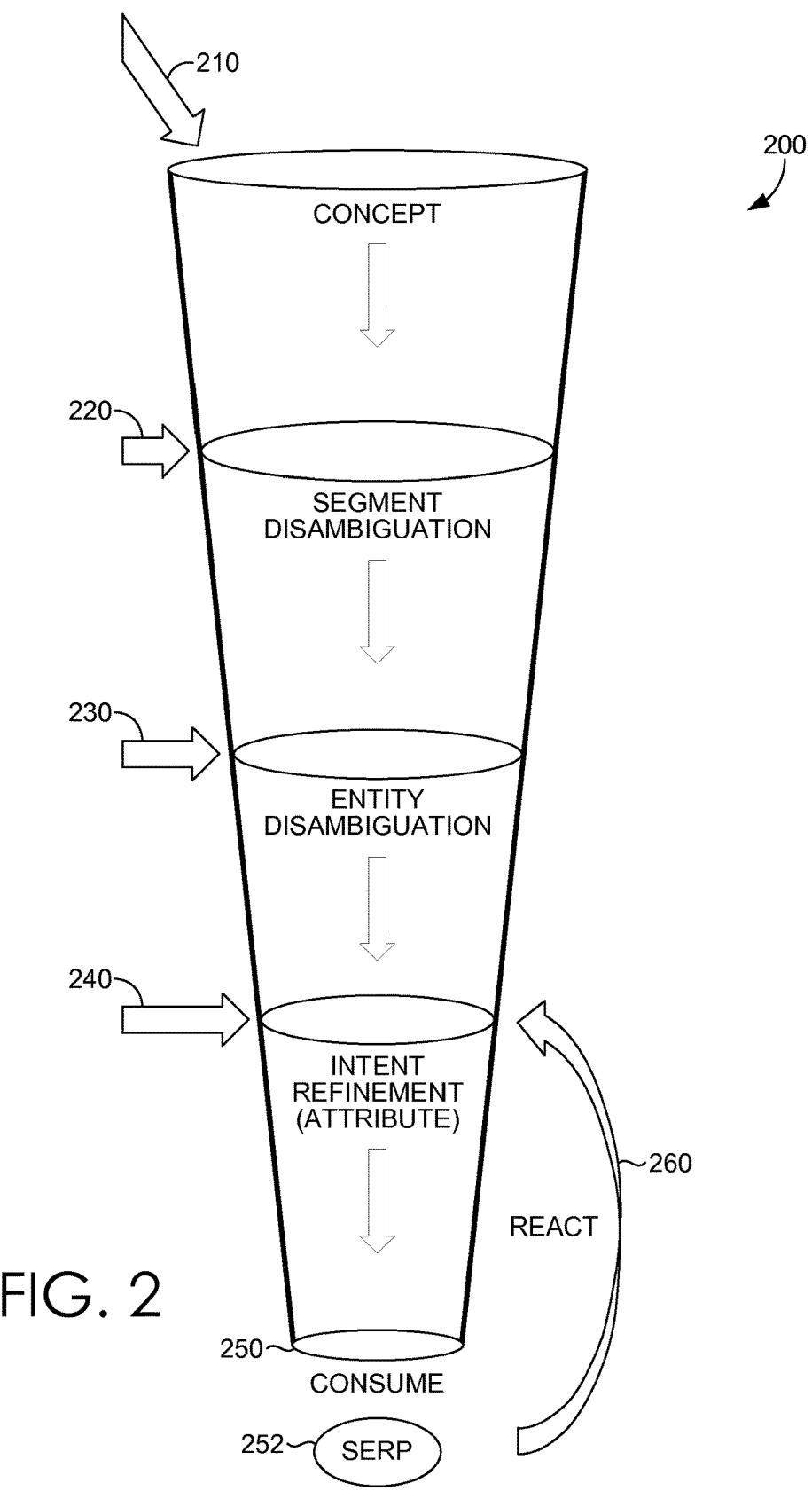
FIG. 2 is a flow diagram showing an exemplary method for intent preview, disambiguation, and refinement of a search, in accordance with an embodiment of the present invention.

Referring to FIG. 2, a flow diagram is provided showing an exemplary method 200 for intent preview, disambiguation, and refinement of a search, in accordance with an embodiment of the present invention. The method 200 allows a user to surface content (e.g., an intent) that is difficult to find using common expressions. The user can enter the method 200 at any point. Similarly, a user can exit the method 200 at any point, such as by executing the unexecuted query. However, the user may determine that reentry is necessary to refine the query.

At the concept stage 210, an initial essence of the query is expressed. For example, the user may begin inputting a search prefix associated with the search query "Harry Potter." The user may actually type "Harry Potter" or an intent suggestion for "Harry Potter" may be provided and selected based on the search prefix. Because a search term like "Harry Potter" may map onto a large set of entities varying in type (e.g., books, characters, movies, actors, costumes, toys, and the like), the search term by itself may be ambiguous. In order to identify the intent or target of the search, intent suggestions identifying basic groups of entities or a few of the top-most ranked entity groups can be provided to the user.

At the segment disambiguation stage 220, a type of entity may be expressed. For example, the user may type "Harry Potter movie" or select an intent suggestion "Harry Potter movie." Similarly, at the entity disambiguation stage 230, more specific information regarding the type of entity may be expressed. For example, the user may desire information about a particular Harry Potter movie. The user may type "Harry Potter movie prisoner of Azkaban" or selected an intent suggestion "Harry Potter movie prisoner of Azkaban." Each token or word added to the unexecuted query string provides a deeper understanding of the intent.

At the intent refinement stage 240, the user may focus the search on a particular aspect of the previewed entity. In the present example, the user may desire to locate information about the cast of the selected movie. For instance, the user may type or select "Harry Potter movie prisoner of Azkaban cast." As previously mentioned, once the user is satisfied the intent or target of the unexecuted search query has been properly identified, the user can execute the unexecuted search query, at the consume stage 250, and the SERP 252 is provided. The user may desire to narrow the focus of the search and may refine the search further at the react stage 260.

Figure 3:
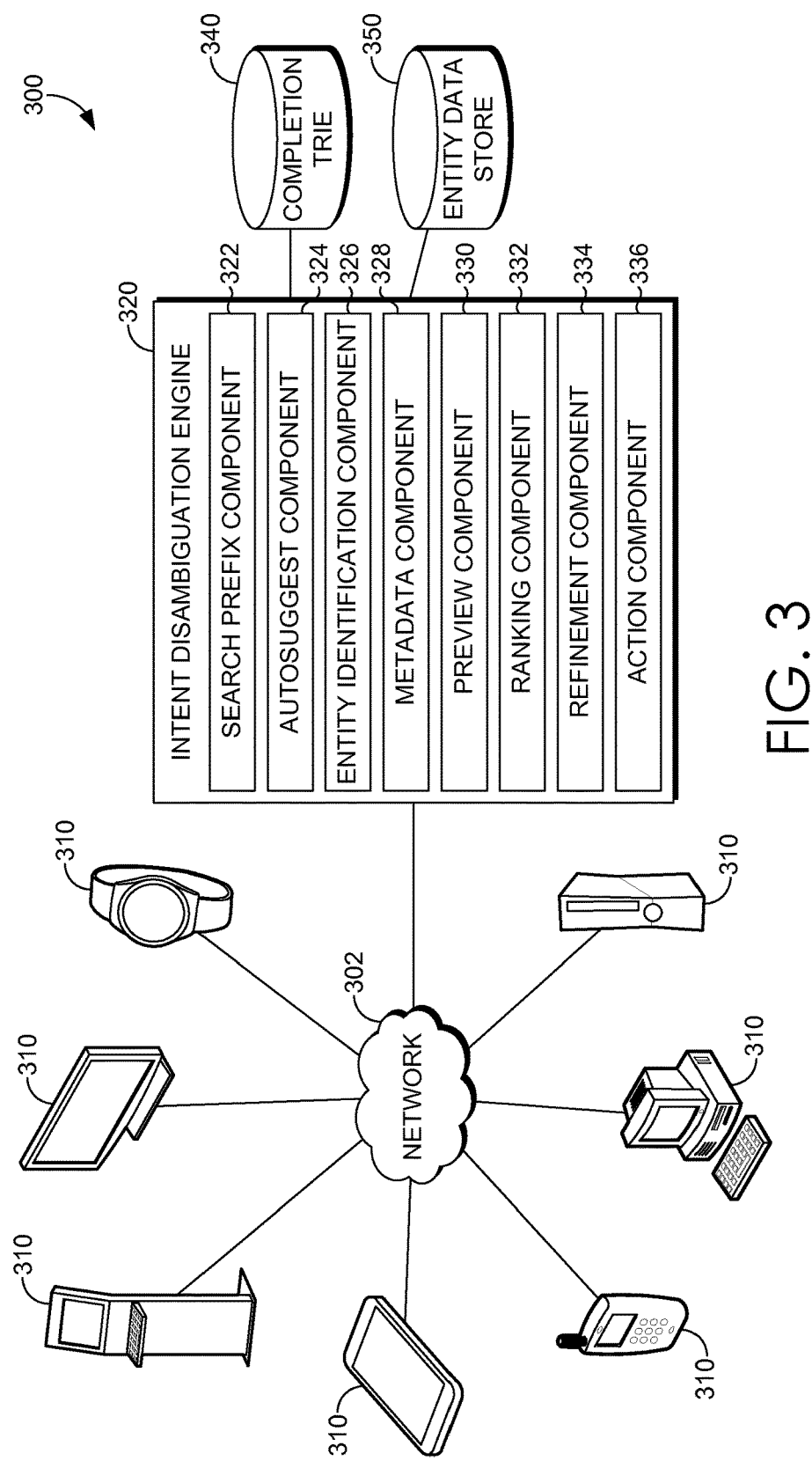
FIG. 3 schematically shows a network diagram suitable for performing embodiments of the present invention.

Referring now to FIG. 3, a block diagram is provided illustrating an exemplary computing system 300 in which embodiments of the present invention may be employed. Generally, the computing system 300 illustrates an environment in which a search session may be conducted utilizing pre-existing search navigation patterns. Among other components not shown, the computing system 300 generally includes user computing devices 310 (e.g., mobile device, television, kiosk, watch, touch screen or tablet device, workstation, gaming system, internet-connected consoles, and the like) and an intent disambiguation engine 320 in communication with one another via a network 302. The network 302 may include, without limitation, one or more local area networks (LANs) and/or wide area networks (WANs). Such networking environments are commonplace in offices, enterprise-wide computer networks, intranets and the Internet. Accordingly, the network 302 is not further described herein.

It should be understood that any number of user computing devices 310 and/or intent disambiguation engines 320 may be employed in the computing system 300 within the scope of embodiments of the present invention. Each may comprise a single device/interface or multiple devices/interfaces cooperating in a distributed environment. For instance, the intent disambiguation engine 320 may comprise multiple devices and/or modules arranged in a distributed environment that collectively provide the functionality of the intent disambiguation engine 320 described herein. Additionally, other components or modules not shown also may be included within the computing system 300.

In some embodiments, one or more of the illustrated components/modules may be implemented as stand-alone applications. In other embodiments, one or more of the illustrated components/modules may be implemented via a user computing device 310, the intent disambiguation engine 320, or as an Internet-based service. It will be understood by those of ordinary skill in the art that the components/modules illustrated in FIG. 3 are exemplary in nature and in number and should not be construed as limiting. Any number of components/modules may be employed to achieve the desired functionality within the scope of embodiments hereof. Further, components/modules may be located on and/or shared by any number of intent disambiguation engines and/or user computing devices. By way of example only, the intent disambiguation engine 320 might be provided as a single computing device (as shown), a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The user computing device 310 may include any type of computing device, such as the computing device 100 described with reference to FIG. 1, for example. Generally, the user computing device 310 includes a display and is capable of executing a search or acting as a host for search results. The search process, among other things, is configured to render search engine home pages (or other online landing pages) and search engine results pages (SERPs), in association with the display of the user computing device 310. The user computing device 310 is further configured to receive user input of requests for various web pages (including search engine home pages), receive user input search queries, receive user input to refine search intent and/or take action on an entity (generally input via a user interface provided on the display and permitting alpha-numeric, voice, motion/gesture, and/or textual input into a designated search input region) and to receive content for presentation on the display, for instance, from the intent disambiguation engine 320. It should be noted that the functionality described herein as being performed by the user device 310 and/or intent disambiguation engine 320 may be performed by any operating system, application, process, web browser, web browser chrome or via accessibility to an operating system, application, process, web browser, web browser chrome, or any device otherwise capable of executing a search or acting as a host for search results. It should further be noted that embodiments of the present invention are equally applicable to mobile computing devices and devices accepting touch, gesture, and/or voice input. Any and all such variations, and any combination thereof, are contemplated to be within the scope of embodiments of the present invention.

The intent disambiguation engine 320 of FIG. 3 is configured to, among other things, provide intent preview, disambiguation, and refinement of a search. The intent disambiguation engine 320 is additionally configured to, among other things, enable actions on entities and provide entity-centric search history and shared data. As illustrated, in various embodiments, the intent disambiguation engine 320 includes a search prefix component 322, an autosuggest component 324, an entity identification component 326, a metadata component 328, a preview component 330, a ranking component 332, a refinement component 334, and an action component 336. The illustrated intent disambiguation engine 320 also has access to a completion trie 340 and an entity data store 350. The completion trie 340 is a data store configured to store and associate intent suggestions with entity identifications ("entity IDs"). The entity data store 350 is a high performance data store configured to provide fast lookup of entities and metadata associated with entities corresponding to one or more entity IDs identified by the completion trie 340. It will be understood and appreciated by those of ordinary skill in the art that the information stored in association with the completion trie 340 and the entity data store 350 may be configurable and may include any information relevant to search queries/terms/histories, intent suggestions, entity identifications, entities, and metadata associated with the entities. The content and volume of such information are not intended to limit the scope of embodiments of the present invention in any way. Further, though illustrated as two, independent components, each of the completion trie 340 and the entity data store 350 may, in fact, be a plurality of storage devices, for instance a database cluster, portions of which may reside in association with the intent disambiguation engine 320, the user computing device 310, another external computing device (not shown), and/or any combination thereof. Further, the completion trie 340 and the entity data store 350 may be combined in a single storage device or database cluster.

The search prefix component 322 of the intent disambiguation engine 320 is configured to receive a search prefix, for instance, utilizing search functionality associated with the user computing device 310. The search prefix comprises one or more characters associated with an unexecuted search query. Upon receiving the one or more characters associated with the unexecuted search query, the search prefix component 322 communicates the search prefix to the autosuggest component 324.

The autosuggest component 324 of the intent disambiguation engine 320 is configured to receive the search prefix comprising one or more characters associated with an unexecuted search query. Upon receiving the search prefix, the autosuggest component 324 retrieves one or more intent suggestions associated with the search prefix. In one embodiment, the one or more intent suggestions are retrieved from the completion trie 340. The intent suggestions represent the most likely intent of the user and/or target(s) of the unexecuted search query. The most likely intent of the user and/or target of the unexecuted search query may be determined by determining the type of query and possible types of entities associated with that type of query. Each of the intent suggestions may also be associated with one or more entity IDs. An entity ID indicates the intent suggestion is associated with one or more entities and may assist the user in distinguishing one intent suggestion from another.

If the intent suggestion is associated with an entity ID, the entity identification component ("entity ID component") 326 of the intent disambiguation engine 320 is configured to retrieve the entity ID. The entity ID may be used to look up metadata associated with one or more entities that is stored, in one embodiment, in the entity data store 350. The entity ID may further describe or indicate the type of entity associated with the entity ID. Such indication may help the user readily locate or identify a particular search within a search history or share a particular search with others.

The metadata component 328 of the intent disambiguation engine 320 is configured to retrieve metadata from the entity data store 350. The metadata corresponds to at least one entity associated with the one or more entity identifications. The metadata may include content associated with the entity such as data or snippets of data that may be returned by or be available via links in search results for that entity. Metadata for multiple entities may be retrieved allowing the user to narrow or refine a search. For example, a primary intent suggestion representing the likely primary focus of the search as well as one or more secondary intent suggestions representing subcategories or subentities of the primary intent suggestion can be retrieved. Similarly, a primary intent suggestion representing the most likely target of the search as well as secondary intent suggestions representing less likely targets of the search can be retrieved. A request to retrieve metadata, in one embodiment, is initiated when the user hovers over or selects an intent suggestion. In another embodiment, metadata for the first intent suggestion or most likely intent suggestion is automatically selected or retrieved.

The preview component 330 of the intent disambiguation engine 320 is configured to provide an aggregated intent preview based on the retrieved metadata corresponding to the at least one entity. The aggregated intent preview is provided without retrieving search results for the unexecuted search query. This allows the user to preview metadata associated with the intent suggestions without consuming the resources necessary to execute the full unexecuted search query. Rather than updating the SERP each time the user selects one of the intent suggestions, the aggregated intent preview provides the user with enough information about a particular entity to narrow the focus of the search. In other words, the aggregated intent preview provides a non-committal preview of one or more entities or subentities to help the user to refine an intent associated with the search without committing to the search until the user is actually ready to execute the search. More simply, the aggregated intent preview does not distract the user by constantly refreshing a SERP associated with a search because the search query is not executed until the user is satisfied the intent of the search is properly identified and adequately focused.

For example, a user may be searching for a particular person or thing. After receiving a search prefix associated with a search query input by the user seeking information regarding that person or thing, the autosuggest component 334 may retrieve several intent suggestions associated with the search prefix. Each of the intent suggestions may be associated with an entity ID that is associated with an intent suggestion that completes the search prefix (e.g., completes the spelling of one or more persons or things associated with the search prefix). The one or more entities or subentities identified in the aggregated intent preview is associated with the intent suggestion and may further identify one or more subcategories or subentities associated with the intent suggestion to help the user refine the search accordingly.

In one embodiment, the ranking component 332 of the intent disambiguation engine 320 is configured to rank the one or more entities. The ranking may be utilized to automatically determine the intent or target of the unexecuted search query. The ranking may be based on entity-intrinsic signals, query-entity interactions by users, and/or query pattern likelihood scores. The entity-intrinsic signals may comprise a number of attributes or a number of information sources. For example, one intent suggestion may be ranked higher than another if it includes more attributes associated with a particular entity. Similarly, one intent suggestion may be associated with a particular entity that has a higher number of information sources than another intent suggestion associated with a different entity. Each of these entity-intrinsic signals may be utilized to assign a static ranking score to the intent suggestion, independent of the unexecuted search query. The same methodology can be utilized to rank and influence the display of entities or subentities provided in the aggregated intent preview.

The query pattern likelihood scores may be based on expected patterns. The expected patterns may be based on entity type, quality standards independent of an individual entity, quality standards independent of associated queries, dominance of one particular entity over another, non-entity associations of the query, and the like.

Expected patterns represent the identification by the system of one or more expected terms, based on the entity type, associated with the intent suggestion. Expected patterns generally are based on data that is typically associated with an entity and which users have come to expect having associated with the particular entity type. For example, each intent suggestion associated with an entity can be examined to identify expected patterns based on the entity type. If the entity type is a business, expected patterns of the intent suggestions may include business names, locations, type of businesses, and the like. On the other hand, if the entity type is a person, expected patterns of the intent suggestions may include first names, middle initials, locations, last names, occupations, and the like.

The quality standards may be independent of the individual entity but may be based on the entity type. For example, a determination can be made to make sure the query includes at least one well known business name or person name. The quality standards may also be independent of the intent suggestions or unexecuted search query. For example, entities may only be included in the aggregate intent preview if they contain a minimum number of attributes or have been updated recently (e.g., within a predetermined or configurable amount of time). Thus, the quality standards ensure that items associated with the query or the entities included in the aggregate intent preview are expected or known (e.g., one or more known terms), meet minimum requirements (e.g., minimum number of entity-intrinsic signals), and up-to-date.

In the instance where one particular entity (e) dominates intent suggestions for an unexecuted search query, it may be determined that intent suggestions associated with a less dominant entity (e', e'', e''', etc.) should not be provided for the unexecuted search query. When one entity (e) exceeds a particular configurable, predetermined, or automatically determined threshold (e.g., given a set of intent suggestions for an unexecuted search query, a percentage of those intent suggestions that corresponds to/is directed to the entity (e) meets or exceeds a threshold), entity (e) may be considered to dominate the intent suggestions for the unexecuted search query. For example, if over fifty percent of the intent suggestions for an unexecuted search query are associated with an entity (e), entity (e) dominates the intent suggestions for the unexecuted search query. As a result, it may be determined that intent suggestions associated with other entities (e', e'', e''', etc.) should not be provided for the unexecuted search query.

However, in situations where multiple entity types may be identified as the possible or likely target or intent of the search, less dominant entities may be associated with the selected intent suggestion even when another more dominant query-entity pair exceeds the particular configurable or automatically determined threshold. For example, a business entity may be dominant to all other entities for the intent suggestion "hotel California." However, song entities associated with the intent suggestion "hotel California" may actually be the target or intent of the user. Even if the business entity exceeds the threshold to be determined a dominant entity for that particular intent suggestion, the song entities are still associated with the intent suggestion until the actual intent or target of the unexecuted search query is determined.

Similarly, non-entity associations of an intent suggestion may also be considered to determine whether a particular entity is dominant. For example, an intent suggestion or unexecuted search query may not have an entity intent (an entity intent suggests the intent or target of the search is an entity). In other words, the intent suggestion or target of the unexecuted search query is not an entity. The intent suggestion or the target of the unexecuted search query may instead target a web resource. In this instance, even when an entity (e.g., business or person entity) exists, the primary intent is the web resource and the query-entity associated is dropped. The primary intent may be determined based on user signals at the time the search prefix is input, how the user interacts with the intent suggestions or aggregated intent preview (e.g., query-entity interactions, entity clicks or clicks on an entity in a search window or third party entity repository, etc.), a search history associated with the user (e.g., search logs, previous query-entity interactions, previous entity clicks or clicks on an entity in a search window or third party entity repository, etc.), third party search history (e.g., search logs, previous third party query-entity interactions, previous third party entity clicks or clicks on an entity in a search window or third party entity repository, etc.).

The refinement component 334 of the intent disambiguation engine 320 is configured to, without retrieving search results for the unexecuted search query, provide a refined intent preview. The refined intent preview is associated with metadata corresponding to one or more subentities. The one or more subentities are based on a selected item of metadata associated with the one or more entities. For example, a user may select or interact with an item from the aggregated intent preview. The selected item may be based on metadata corresponding to the one or more entities associated with an intent suggestion. The selected item may be associated with one or more subentities related to the entity. Such a selection allows the user to further refine the search by narrowing the focus or intent of the search without actually executing the unexecuted search query.

The action component 336 of the intent disambiguation engine 320 is configured to enable task completion for a selected entity or subentity in association with the aggregated intent preview. This allows the aggregated intent preview to not only identify an intent of the search but actually allows the user to complete a task or action associated with the unexecuted search query. For example, a user may desire information about a particular movie. The action component allows the user to actually view or download the movie, such as on Netflix®. The action component may provide a link or tile that, upon selection, opens an application, independent window, link, or process to execute the task. In one embodiment, upon selection of the link or tile, the action component opens an application, independent window, link, or process without affecting the search window. In one embodiment, upon selection of the link or tile, the action component opens an application, independent window, link, or process and the search is refined or updated. In one embodiment, upon selection of the link or tile, the action component opens an application, independent window, link, or process and the search window is closed. As can be appreciated, any number of actions or tasks may be enabled by the action component 336. For example, an application may be available that relates to a particular entity or subentity. Upon selection, the application is installed on the user device. Similarly, tickets or reservations to a particular event or place can be purchased or made by the action component 336. In one embodiment, the action component 336 is configured to include paid placement text or display advertisements in association with the aggregated intent preview.

With reference to FIGS. 4-19, illustrative screen displays for non-committal intent preview, disambiguation, and refinement of a search are provided. It is understood that each of the illustrative screen displays are connected logically, such that they comprise a user interface designed for non-committal intent preview, disambiguation, and refinement of a search. The screen displays may appear in any order and with any number of screen displays, without regard to whether the screen display is described or depicted herein.

Figure 4:
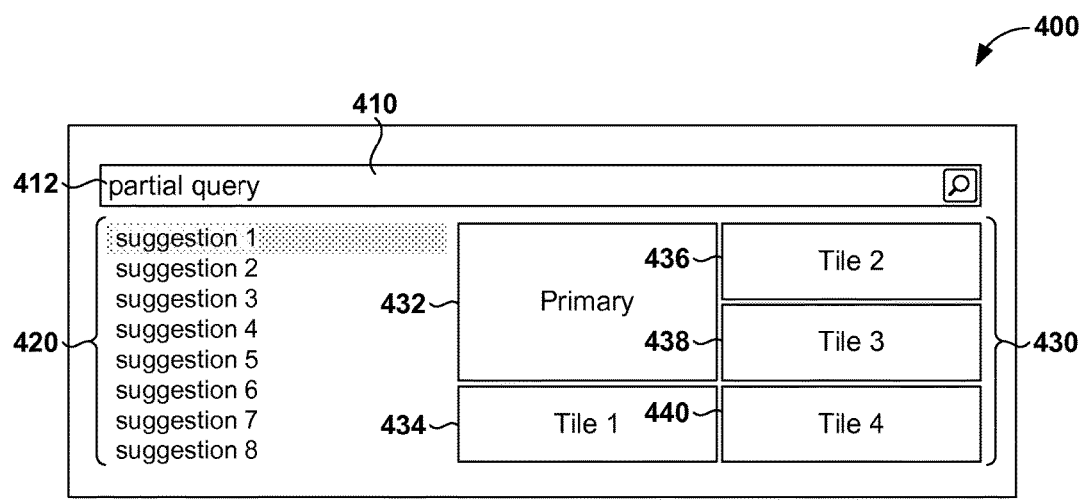

Referring now to FIG. 4, an illustrative screen display 400 of an embodiment of the present invention is shown. A search display area displays a search bar 410 for receiving a search prefix 412 from a user corresponding to an unexecuted search. Autosuggest display area 420 displays, without executing the search, one or more intent suggestions 421, 422, 423, 424, 425, 426, 427, 428 to the user. Entity display area 430 displays, without executing the search, an aggregated intent preview comprising metadata associated with at least one entity 432, 434, 436, 438, 440 corresponding to entity identifications associated with the one or more intent suggestions. The aggregated intent preview may include a main or primary entity 432 that appears larger than the other entities (i.e., secondary entities). The primary entity 432 may be ranked higher than the other entities, such as by the ranking methodology described herein. The secondary entities 434, 436, 438, 440 may be subentities associated with the primary entity 432 or may be distinct entities altogether, such as lower ranked entities. Each of the entities may be selectable, such as to further refine the intent of the search, but without executing the search, or enable action or completion of a particular task, such as those actions and tasks described herein.

Figure 5:
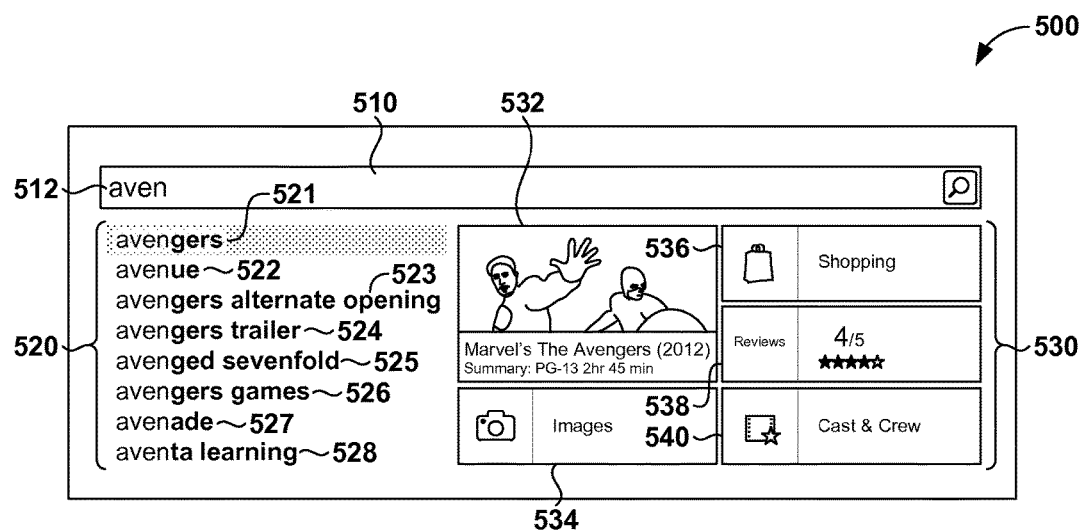

In FIG. 5, an illustrative screen display 500 of an embodiment of the present invention is shown. The search display area displays a search bar 510 with the search prefix 512 "aven." Autosuggest display area 520 displays, without executing the search, intent suggestions 521, 522, 523, 524, 525, 526, 527, 528. In this example, intent suggestions 521, 522, 523, 524, 525, 526, 527, 528 include "avengers", "avenue", "avengers alternate opening", "avengers trailer", "avenged sevenfold", "avengers games", "avenade", "aventa learning" to the user. The intent suggestions 521, 522, 523, 524, 525, 526, 527, 528 may be ranked such as by the ranking methodology described herein. Entity display area 530 displays, without executing the search, an aggregated intent preview comprising metadata associated with at least one entity. As illustrated, the entities include the primary entity 532, Marvel's The Avengers and secondary entities 534, 536, 538, 540. In this example the secondary entities 534, 536, 538, 540 include Images (i.e., associated with the primary entity, "Marvel's The Avengers"), Shopping (i.e., for items associated with the primary entity), Reviews (i.e., of the primary entity), Cast & Crew (i.e., for the primary entity) and correspond to entity identifications associated with the one or more intent suggestions or, in this case, the primary entity 532. The primary entity 532 may be identified by the user such, as by selecting an intent suggestion, or may be automatically selected corresponding to a ranking identifying the most likely entity (thus, intent) of the search. Each of the entities is selectable, such as to further refine the intent of the search, but without executing the search, or enable action or completion of a particular task, such as those actions and tasks described herein. For instance, the user can narrow the search to identify images associated with "Marvel's The Avengers" by selecting the tile or secondary entity 534 (e.g., Images), or by typing additional characters into the search bar 510. Selection of the Images entity may narrow the search further, such as by identifying particular scenes or characters. This results in the display of a refinement display area that displays, without executing the search, a refined intent preview comprising metadata associated with a subentity corresponding to a selected item of metadata associated with the at least one entity. Selection of the Images entity may also enable the user to complete a task, such as by allowing the user to view images associated with the movie via another website, application, and the like.

Figure 6:
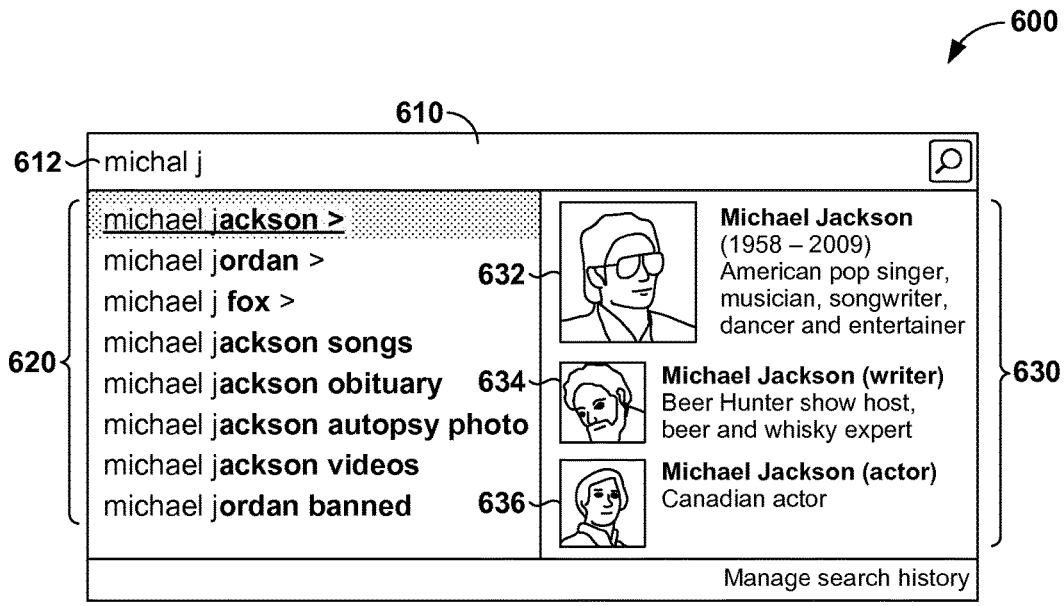

Turning now to FIG. 6, an illustrative screen display 600 of an embodiment of the present invention is shown. The search display area displays a search bar 610 with the search prefix 612. Autosuggest display area 620 displays, without executing the search, one or more intent suggestions to the user. The intent suggestions may be ranked such as by the ranking methodology described herein. Entity display area 630 displays, without executing the search, an aggregated intent preview comprising metadata associated with one or more entities 632, 634, 636. The entities 632, 634, 636 correspond to entity identifications associated with the one or more intent suggestions 620 or, in this case, multiple entities 632, 634, 636 of the same entity type. Although the most likely intent may be predicted or automatically selected, such as by the ranking methodology described herein, other candidates of the same entity type may also be provided to allow the user to more easily identify the target of the search. The most likely intent (i.e., primary intent) 632 is scaled, in one embodiment, to appear larger or occupy more space in the aggregated intent preview provided in the entity display area 630 than the less likely, secondary intents 634, 636. In one embodiment, the aggregated intent preview is automatically expanded based on intent confidence. In other words, if the intent confidence, as determined by the ranking methodology described herein or any methodology for determining confidence, exceeds a configurable threshold, the aggregated intent preview is automatically expanded and populated with one or more entities and associated metadata based on the determined or predicted intent.

As illustrated in FIG. 6, the search prefix 612 "michal j" and selection of intent suggestion "michael jackson" may result in the display of three entities 632, 634, 636 corresponding to the selected intent suggestion. The three entities 632, 634, 636 may be the same type, in this case people entities, each associated with a metadata corresponding to a subentity (e.g., profession, location, and the like) associated with each people entity. The entity display area 630 is scaled, in one embodiment, based on relevance signals or likelihood of intent. For example, an entity tile associated with the primary intent 632 may appear larger or occupy more space in the entity display area 630 than other secondary intents 634, 636. Each of these primary and secondary intents 632, 634, 636 is selectable to allow the user to identify the appropriate intent of the search or further refine the search without actually executing the search. For instance, the user can narrow the search to identify, target, or preview subentities associated with the selected entity. Further, each of the entities 632, 634, 636 may enable action or completion of a particular task, such as those actions and tasks described herein. Once the user has properly identified or narrowed the intent of the search, the user can execute the search.

Figure 7:
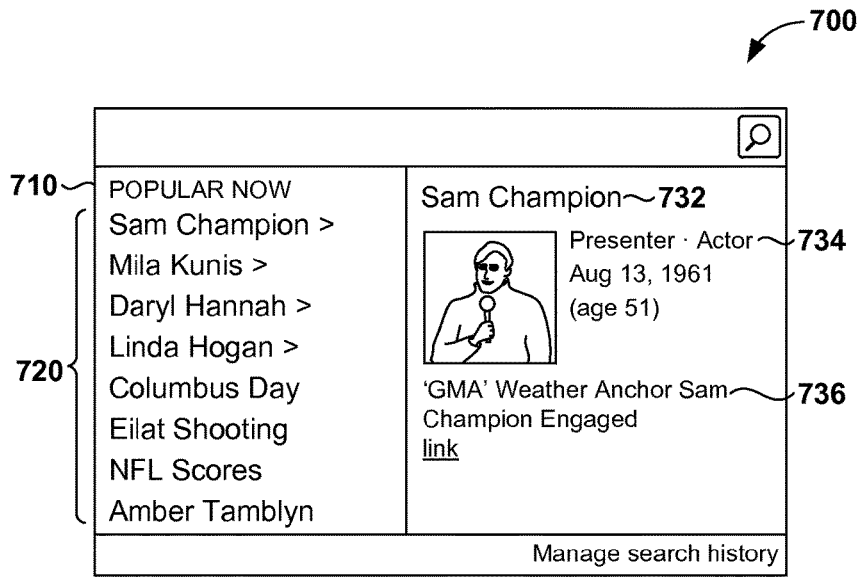

With reference now to FIG. 7, an illustrative screen display 700 of an embodiment of the present invention is shown. In one embodiment, a popular now display area 710 displays metadata 734, 736 associated with one or more entities 732 corresponding to entity identifications not associated with a search prefix received in the search bar. In other words, the popular now display area 710 can be provided without receiving a search prefix corresponding to a search. Rather, the popular now display area 710 displays intent suggestions 720 associated the most popular entities based on a search history, query-entity interactions, or entity click data. The search history, query-entity interactions, or entity click data may be associated with a user or group of users, such as a group of users associated with the user in a social network, location, place of employment, occupation, interest, proximity, subscription, school, demographics, and the like. The search history, query-entity interactions, or entity click data may be based on a configurable time range. The configurable time range may be set for any time range in the past, present, or future (i.e., such as for predicting likely popular searches, search terms, and entities in the future based on expected news, forecasts, events, schedules, holidays, press releases, product information, and the like).

Figure 8:
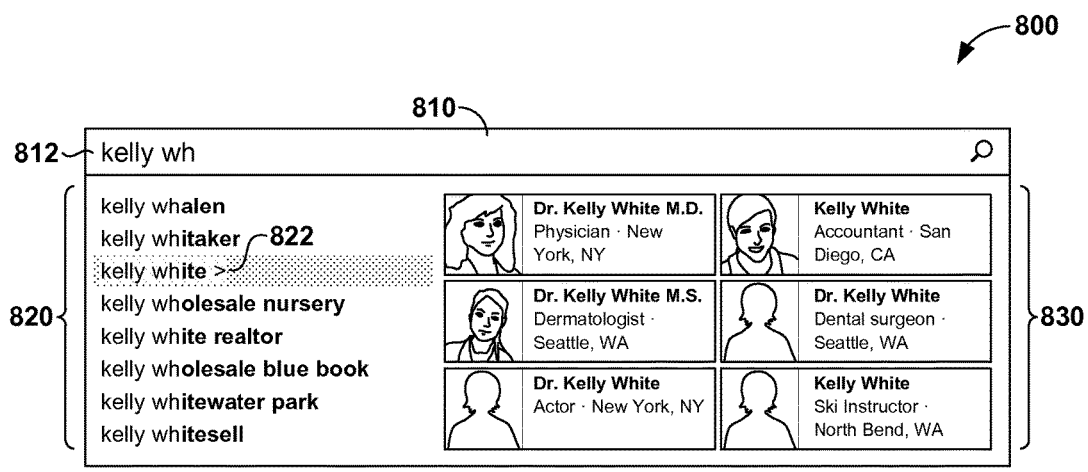

In FIG. 8, an illustrative screen display 800 of an embodiment of the present invention is shown. As illustrated, after a search prefix 812 is received in the search bar 810, the autosuggest display area 820 displays, without executing the search, one or more intent suggestions to the user. Once an intent suggestion 822 is selected, the entity display area 830 displays, without executing the search, an aggregated intent preview comprising metadata associated with at least one entity corresponding to entity identifications associated with the one or more intent suggestions. In this example, the intent suggestion 822 "kelly white" was selected. As illustrated, multiple entities corresponding to the entity identification associated with the intent suggestion "kelly white" are provided in the entity display area 830. Metadata corresponding to each entity is provided allowing the user to determine which entity or "kelly white" is the intent or target of the search. In some instances, the search may need to be refined further, such as by selecting one of the entities in the entity display area 830. For example, there may be multiple entities or subentities associated with one of the entities. In this case, there may be multiple ski instructors named "Kelly White" in North Bend, Wash. The user may select the corresponding entity to refine the search further, in which case additional metadata is retrieved and provided for subentities associated with the selected entity allowing the user to select the appropriate entity or subentity.

Figure 9:
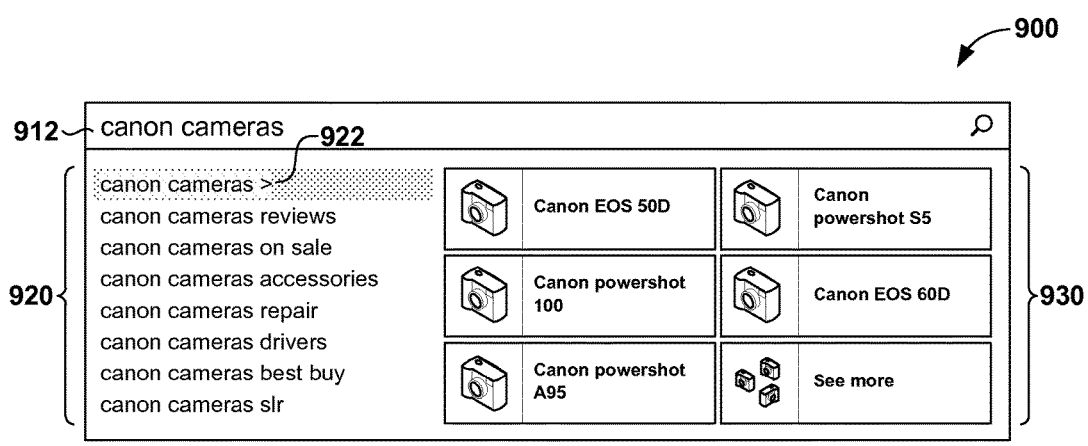

Turning now to FIG. 9, an illustrative screen display 900 of an embodiment of the present invention is shown. Similar to the example set forth and illustrated in FIG. 8, FIG. 9 depicts an entity display area 930 displaying multiple entities associated with a selected intent suggestion 922. Each of the entities allows the user to further refine the search until the actual intent is determined and the search query is executed. For example, a user may type the search prefix 912 "canon cameras." Intent suggestions are provided in the autosuggest display area 920. Once the intent suggestion 922 is selected, either automatically based on intent confidence or manually by the user, metadata corresponding to entities associated with the intent suggestion is retrieved and provided in the entity display area 930. As desired, the user can refine the search further by selecting an entity or subentity which results in subentities and corresponding metadata being provided in the entity display area 930.

Figure 10:
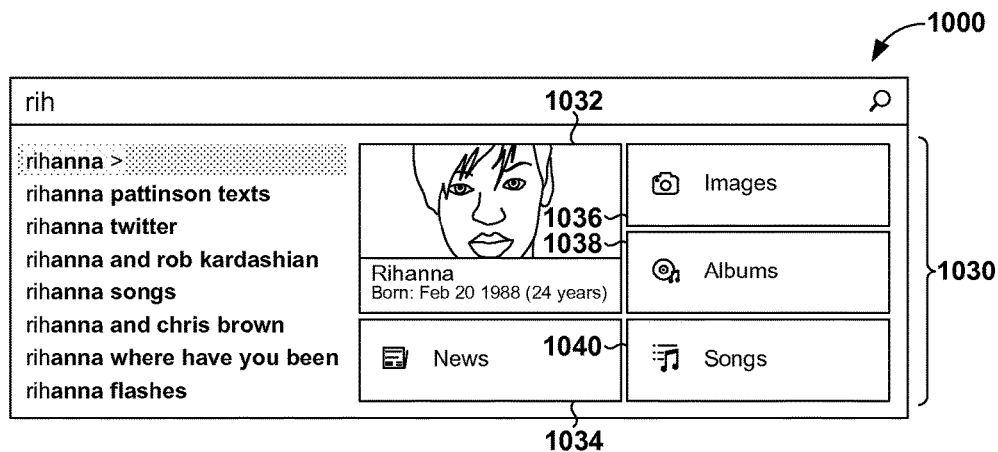

With reference now to FIG. 10, an illustrative screen display 1000 of an embodiment of the present invention is shown. As illustrated, the metadata provided by the entity display area 1030 is provided for a single entity and is divided into entity or intent disambiguation tiles corresponding to a primary intent 1032 and secondary intents 1034, 1036, 1038, 1040. The primary intent 1032 may allow the user to execute the search for the selected intent suggestions or entity depicted by the entity display area 1030, while the secondary intents 1034, 1036, 1038, 1040 may allow the user to refine the search further for the entity or a particular subentity as already described herein.

Figure 11:
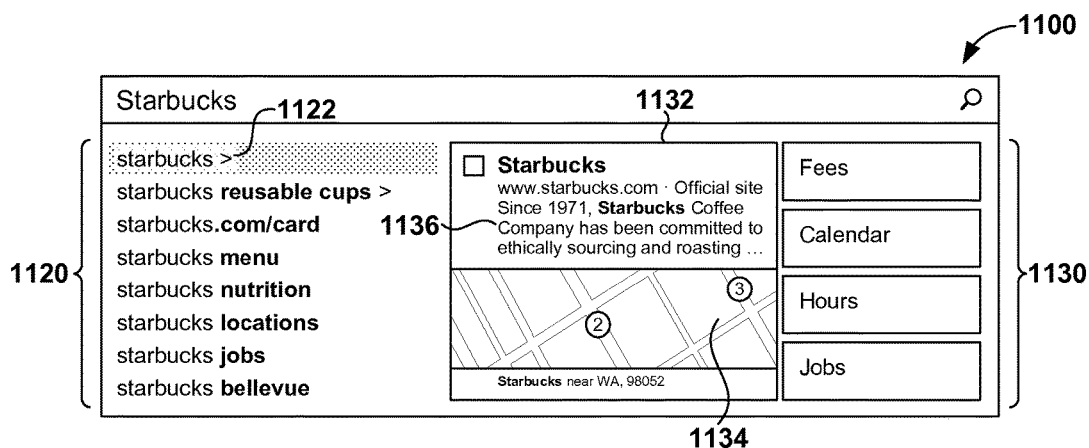

In FIG. 11, an illustrative screen display 1100 of an embodiment of the present invention is shown. A navigational display area 1134 may appear in the entity display area 1130 corresponding to the intent suggestion 1122 selected from the one or more intent suggestions 1120. The navigational display area 1134 may represent local intent associated with the entity 1132. As illustrated, the navigational display area 1134 displays a map and/or directions to an entity provided in the entity display area 1130. The navigational display area 1134 may further enable an action or task, as described in more detail below, such as providing directions from a location associated with the user to the nearest entity or an entity associated with a selected location. In one embodiment, an advertisement display area 1136 displays text or display advertisements for a particular entity. The text or display advertisements may be paid for by or auctioned to a provider distinct or independent of the search provider, such as the provider associated with the entity (e.g., Starbucks®). The text or display advertisements (e.g., paid placement for advertisements) may also be associated with an action or completion of a task (e.g., promoting download of an application) as described in more detail below.

Figure 12:
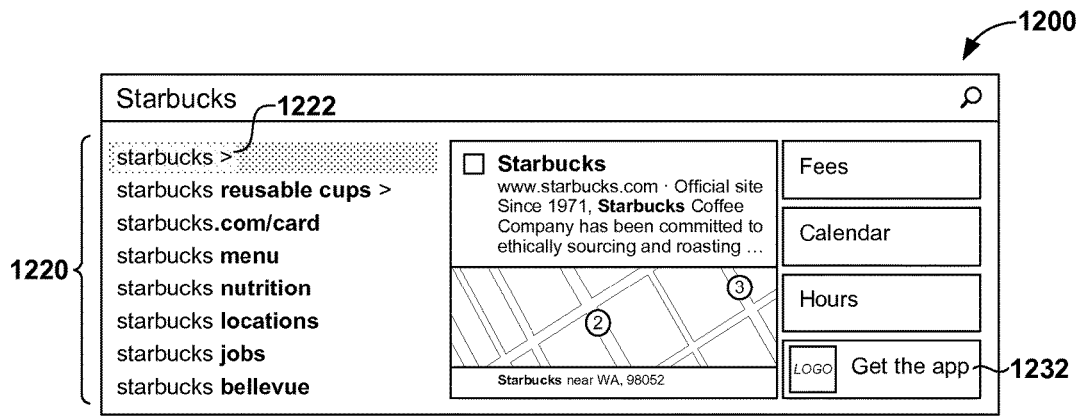

Turning now to FIG. 12, an illustrative screen display 1200 of an embodiment of the present invention is shown. An action display area 1232, in one embodiment, displays an action available for the user to take on a particular entity. The action enables task completion for the intent suggestion 1222 selected from the one or more intent suggestions 1220. In one embodiment, the task completion is provided by a provider distinct or independent of the search provider. In one embodiment, the action may request or install an application associated with the distinct or independent provider.

Figure 13:
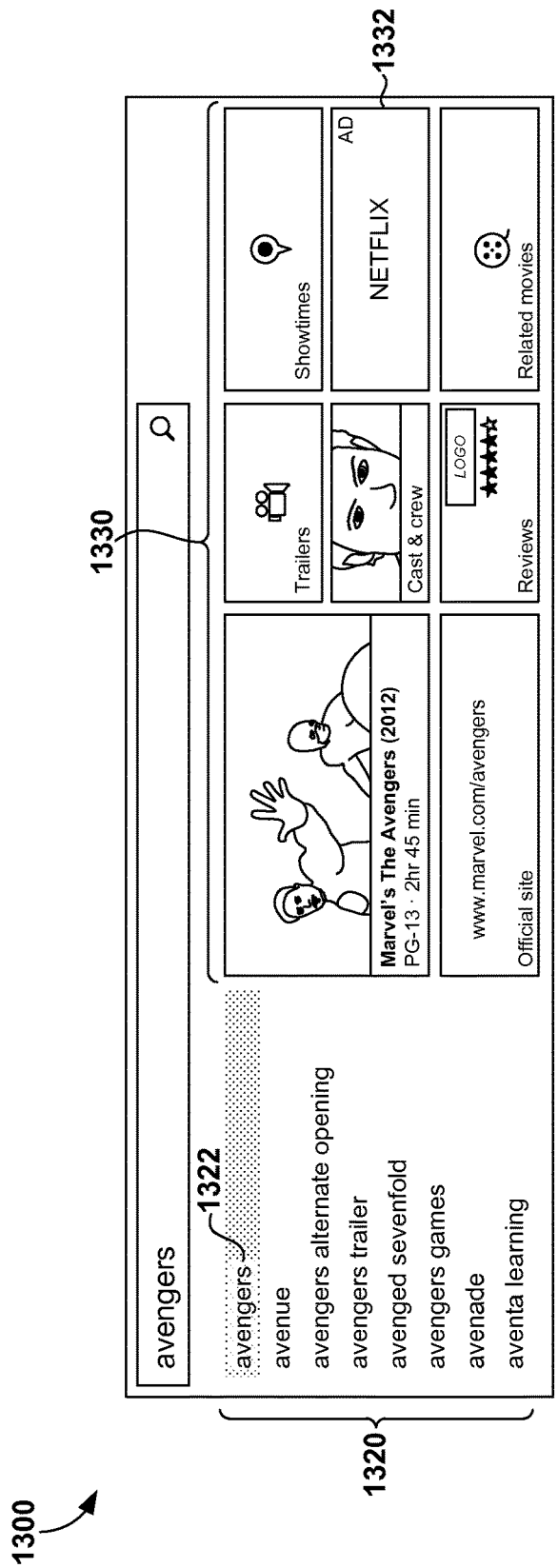

Similarly, and with reference now to FIG. 13, an illustrative screen display 1300 of an embodiment of the present invention is shown. The action display area 1332 may appear in the entity display area 1330 corresponding to the intent suggestion 1322 selected from the one or more intent suggestions 1320. In one embodiment, the action is provided by a provider distinct or independent of the search provider. In one embodiment, the action may execute an application provided by the distinct or independent application provider, request permission to install the application, or request login credentials for an account associated with the application or provider.

In FIGS. 14A and 14B, illustrative screen displays depict mobile embodiments of the present invention. As illustrated in FIG. 14A, after a search prefix 1412 is received in the search bar 1410, the autosuggest display area 1420 displays, without executing the search, one or more intent suggestions to the user. Once an intent suggestion 1422 is selected, the entity display area 1430 displays (as illustrated in FIG. 14B), without executing the search, an aggregated intent preview comprising metadata associated with at least one entity corresponding to entity identifications associated with the one or more intent suggestions. In this example, the intent suggestion 1422 "rihanna" was selected. As illustrated, multiple entities corresponding to the entity identification associated with the intent suggestion "rihanna" are provided in the entity display area 1430. Metadata corresponding to each entity is provided allowing the user to determine which entity associated with the intent suggestion "rihanna" is the actual intent or target of the search. In some instances, the search may need to be refined further, such as by selecting one of the entities in the entity display area 1430. For example, there may be multiple entities or subentities associated with one of the entities. In this case, there may be multiple items of metadata 1434, 1436, 1438, 1440, each representing secondary intents or subentities associated with the primary intent or entity 1432. The user may select the desired entity or subentity to refine the search further, in which case additional metadata is retrieved and provided for the selected entity or subentity allowing the user to identify the appropriate entity or subentity.

Figure 15:
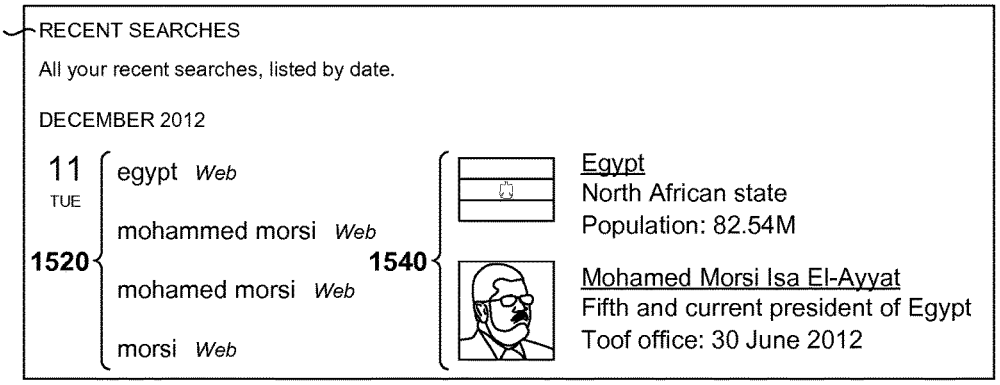

Turning now to FIG. 15, an illustrative screen display 1500 of an embodiment of the present invention is shown. As illustrated, a search history display area 1510 displays, in one embodiment, a set of queries 1520 issued by the user and entities 1540 corresponding to the set of queries 1520. The entities 1540 enable the user to interact with the search history. This allows a user to quickly assimilate and understand a view associated with the user's search history. In one embodiment, the search history display area 1510 displays an aggregate set of queries issued by multiple users and entities corresponding to the aggregate set of queries, such as might be implemented in an embodiment to display which entities are being searched for the most by a population of users.

Figure 16:
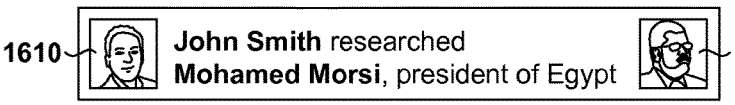

With reference now to FIG. 16, an illustrative screen display of an embodiment of the present invention is shown. As illustrated, a social network display area 1600 displays a topic or entity 1620 shared by one or more users 1610 via a social network. The topic or entity represents a set of queries issued by the one or more users 1610 and characterized by metadata associated with the at least one entity 1620. The entity may be selectable, allowing a user to retrace the steps of the research performed by the user sharing the entity 1620. The entity may be selectable, allowing a user to execute a search associated with the entity 1620. In one embodiment, the search may be executed with the same operating system, application, process, web browser, web browser chrome, or device otherwise capable of executing a search or acting as a host for search results as the original shared search. In one embodiment, the search may be executed with a different operating system, application, process, web browser, web browser chrome or via accessibility to an operating system, application, process, web browser, web browser chrome, or any device otherwise capable of executing a search or acting as a host for search results than the original shared search.

Figure 17:

In FIG. 17, an illustrative screen display 1700 of an embodiment of the present invention is shown. As illustrated, a multi-user history display area 1700 displays a set of entities 1730 corresponding to a set of most popular searched for entities 1720 over a predetermined period of time by a population of users. The multi-user history display area 1700 may be tailored by a user to select specific topics or entities. The multi-user history display area 1700 then identifies the set of most popular searched for entities corresponding to the selected topic or entity. For example, and referring again to FIG. 17, a user may be interested in the most researched presidents in the last month. As illustrated, a most popular search for presidents entity search may result in a set of entities 1730 that includes presidents 1732, 1734, 1736.

Turning now to FIG. 18, an illustrative screen display 1800 of an embodiment of the present invention is shown. As illustrated, an annotated query display area 1800 displays an annotated query 1810 with a set of previously identified entities 1812, 1814, 1816 for the query 1810. Similarly, and with reference now to FIG. 19, an illustrative screen display 1900 of an embodiment of the present invention is shown. As illustrated, an annotated entity display area 1900 displays an annotated entity 1912, 1914, 1916, 1918, 1920 with a set of previously identified metadata 1922, 1924, 1926, 1928, 1930 for each entity. In each of the annotated query display area 1800 and annotated entity display area 1900, the set of previously identified entities for a query or metadata for the entity is automatically populated with previously existing information. This allows the intent disambiguation engine 320 of FIG. 3, for example, to retrieve valuable information for a user with minimal time, effort, and resources.

Figure 20:
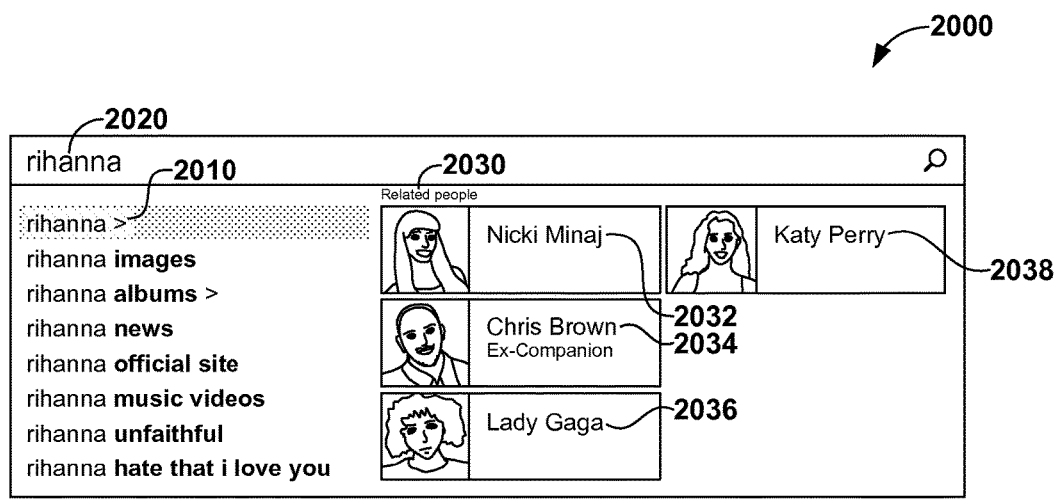

In FIG. 20, an illustrative screen display 2000 of an embodiment of the present invention is shown. As illustrated, the metadata provided by the entity preview area 2010 is provided for related intents 2032, 2034, 2036, 2038. The related intents 2032, 2034, 2036, 2038 are the result of a user executing a query for a selected primary intent, contextual signals, and further interaction. Referring back to FIG. 10, a user may select to execute the search for one of the entities the primary intent 1032 of FIG. 10. If the user is not satisfied with the search results, any interactions (e.g., query-entity interactions, entity clicks, etc.) may provide contextual information when the user further interacts with the search bar 2020 for the selected intent suggestion 2010. As a result, rather than identifying the same primary intent 1032 and secondary intents 1034, 1036, 1038, 1040 as illustrated in FIG. 10, by identifying and leveraging any contextual information, related intents 2032, 2034, 2036, 2038 are provided instead. The related intents 2032, 2034, 2036, 2038 allow the user to continue the search experience recognizing that the intent has changed in accordance with the contextual information and further interaction with the search bar 2020.

Figure 21:
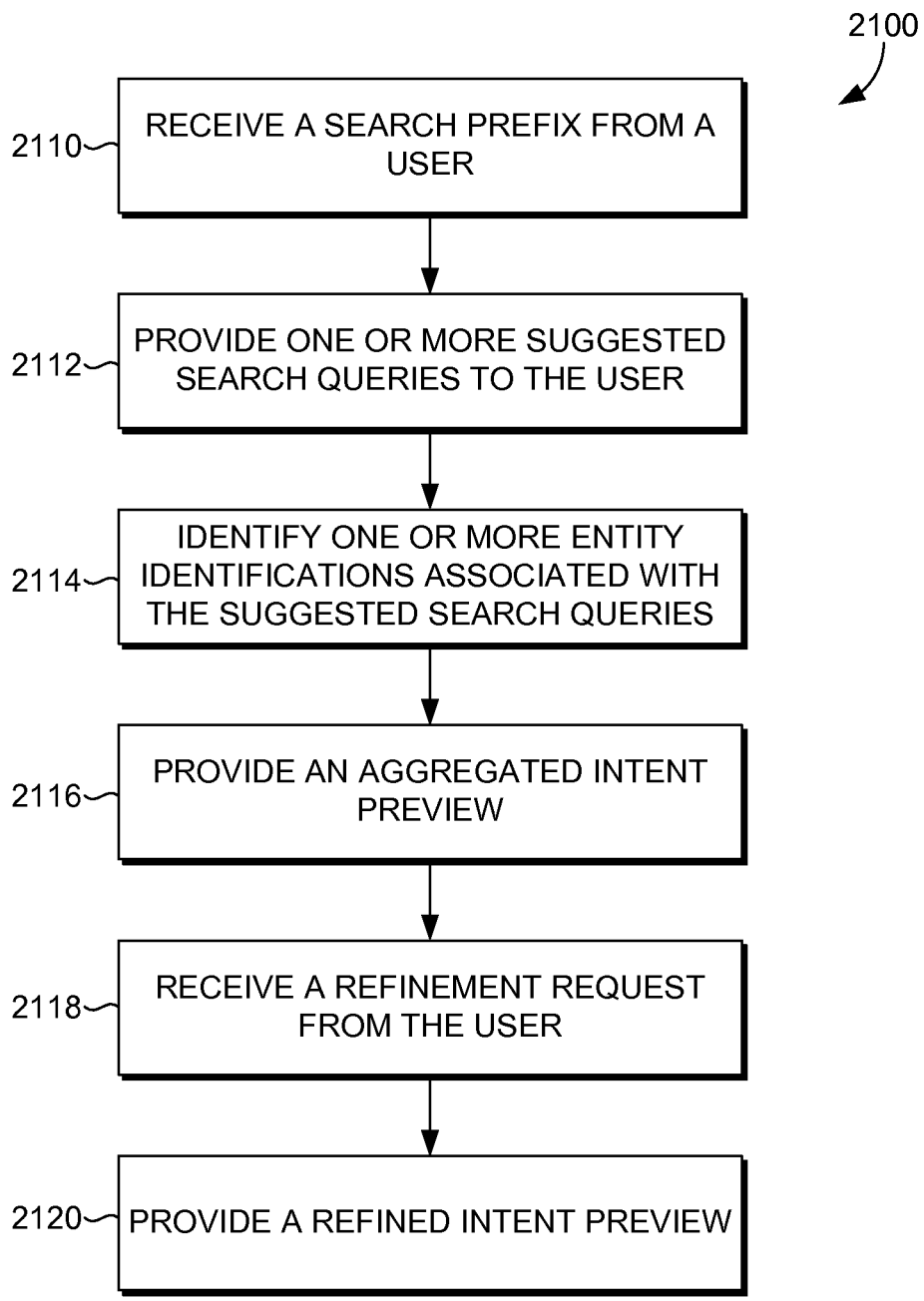
FIG. 21 is a flow diagram showing an exemplary method for intent preview, disambiguation, and refinement of a search, in accordance with an embodiment of the present invention.

Referring now to FIG. 21, a flow diagram is illustrated showing an exemplary method 2100 of non-committal intent preview, disambiguation, and refinement of a search. As indicated at block 2110, a search prefix is received from a user (e.g., utilizing the search prefix receiving component 322 of the intent disambiguation engine 320 of FIG. 3). The search prefix comprises one or more characters associated with a search query. As indicated at block 2112, one or more intent suggestions are provided to the user (e.g., utilizing the autosuggest component 324 of the intent disambiguation engine 320 of FIG. 3). The one or more intent suggestions may be based on a comparison of the search prefix to an autosuggest store. The one or more intent suggestions may be retrieved by an application programming interface (API) call to the autosuggest store. The one or more intent suggestions may be rendered by a separate service from the intent disambiguation engine 320.

One or more entity IDs associated with the intent suggestions are identified as indicated at block 2114 (e.g., utilizing the entity identification component 326 of the intent disambiguation engine 320 of FIG. 3). The one or more intent suggestions may be based on an entity ranking. In other words, the entities associated with the intent suggestions that are the most likely target or intent of the search may be ranked and identified. The ranking may be in accordance with the ranking methodology described herein. For example, in one embodiment, the one or more entities are ranked based on entity-intrinsic signals, query-entity interactions by users, and query pattern likelihood scores. In one embodiment, the query pattern likelihood scores are based on entity type, quality standards independent of an individual entity, quality standards independent of associated queries, dominance of one particular entity over another, and non-entity associations of the query. In one embodiment, the ranked entities are associated with a set of user queries. The set of user queries may be associated with a single user or multiple users over time.

An aggregated intent preview is provided as indicated at step 2116 (e.g., utilizing the preview component 330 of the intent disambiguation engine 320 of FIG. 3). The aggregated intent preview comprises metadata corresponding to one or more entities associated with at least one of the one or more entity IDs (the metadata is retrieved, for example, by the metadata component 328 of the intent disambiguation engine 320 of FIG. 3). To provide better efficiency and conserve network, bandwidth, and user device resources, the metadata may be retrieved in a separate API call from the user interface than the API call that retrieves the one or more intent suggestions. In one embodiment, a separate service renders the metadata than the service rendering the one or more intent suggestions and/or the intent disambiguation engine 330.

As indicated at block 2118, a refinement request is received from the user. The refinement request comprises an indication the user has selected an item associated with the one or more entities. More simply, the refinement request is an indication the user determined to refine or narrow the focus or intent of the search. The item of metadata may correspond to a subentity (i.e., a subset of metadata associated with the entity that may focus on one aspect associated with or further define or distinguish the entity). Metadata associated with the selected subentity is retrieved, for example, by the metadata component 328 of the intent disambiguation engine 320 of FIG. 3.

A refined intent preview is provided as indicated at block 2120 (e.g., utilizing the refinement component 334 of the intent disambiguation engine 320 of FIG. 3). The refined intent preview allows the user to narrow the intent of the unexecuted search without executing the search. For example, the user may enter the search prefix "bellevue weath." Based on this search prefix, one of the intent suggestions provided may be "bellevue weather." After selecting this intent suggestion, either automatically based on confidence or manually by the user, the aggregated intent preview may comprise metadata corresponding to "Bellevue, Wash. weather", "Bellevue, Nebraska weather", and "Bellevue, Ohio" weather. Based on the intent of the user, the user is able to identify the appropriate location of desired weather and refine the intent accordingly. After the user refines the intent to the desired location, additional metadata associated with that selected location may be provided and refined even further, as described herein.

As can be understood, embodiments of the present invention provide systems, methods, and computer-readable storage media for, among other things, non-committal intent preview, disambiguation, and refinement of a search. A search prefix comprising one or more characters associated with an unexecuted search query may be received. One or more intent suggestions may be suggested to a user. For each of the one or more intent suggestions, one or more entity identifications associated with each of the one or more intent suggestions may be received. Metadata corresponding to at least one entity associated with the one or more entity identifications may be retrieved from an entity data store. Without retrieving search results for the unexecuted search query, an aggregated intent preview based on the retrieved metadata corresponding to the at least one entity may be provided.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in methods 200 of FIG. 2 and 2100 of FIG. 21 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. Computer storage media having computer-executable instructions embodied thereon that, when executed by one or more computing devices, cause the one or more computing devices to perform a method of non-committal intent preview, disambiguation, and refinement of a search, the method comprising:
    receiving a search prefix from a user, the search prefix comprising one or more characters associated with a search query;
    providing one or more intent suggestions to the user based on a comparison of the search prefix to an autosuggest data store;
    identifying one or more entity identifications associated with the intent suggestions based on an entity ranking;
    providing an aggregated intent preview comprising metadata corresponding to one or more entities associated with at least one of the one or more entity identifications;
    receiving a refinement request from the user to refine an intent of the search query without executing a search corresponding to the search query or the refinement request, the refinement request comprising an indication that the user has selected an item of metadata associated with the one or more entities, the item of metadata corresponding to a subentity;

providing a refined intent preview comprising metadata corresponding to the subentity without executing the search; and upon receiving an indication the user is satisfied the intent of the search query has been identified, executing the search query.

2. The computer storage media of claim 1, further comprising ranking the one or more entities based on entity-intrinsic signals, query-entity interactions by users, and query pattern likelihood scores.

3. The computer storage media of claim 2, wherein the query pattern likelihood scores are based on expected patterns based on entity type, quality standards independent of an individual entity, quality standards independent of associated queries, dominance of one particular entity over another, and non-entity associations of the query.

4. The computer storage media of claim 1, further comprising associating ranked entities with a set of user queries, the set of user queries associated with a single user or multiple users over time.

5. Computer storage media having computer-executable instructions embodied thereon that, when executed by one or more computing devices, cause the one or more computing devices to produce a graphical user interface (GUI) for non-committal intent preview, disambiguation, and refinement of a search, the GUI comprising:

a search display area that displays a search bar for receiving, from a user, a search prefix corresponding to a search;

an autosuggest display area that displays, without executing the search, one or more intent suggestions to the user;

an entity display area that displays, without executing the search, an aggregated intent preview comprising metadata associated with at least one entity corresponding to entity identifications associated with the one or more intent suggestions;

a refinement display area that displays, without executing the search corresponding to the search or a refinement request, a refined intent preview comprising metadata associated with a subentity corresponding to an item of metadata selected by the user and associated with the at least one entity; and an action display area that, upon receiving an indication the user is satisfied the intent of the search query has been identified, enables the user to execute search query.

6. The computer storage media of claim 5, wherein the entity display area is scaled based on relevance signals associated with the at least one entity.

7. The computer storage media of claim 5, further comprising a popular now display area that displays metadata associated with one or more entities corresponding to entity identifications not associated with a search prefix received in the search bar.

8. The computer storage media of claim 5, wherein the metadata provided by the aggregated intent preview is divided into entity or intent disambiguation tiles.

9. The computer storage media of claim 5, further comprising a navigational display area that displays a map and/or directions to an entity provided in the entity display area.

10. The computer storage media of claim 5, further comprising the action display area that displays an action available for the user to take on a particular entity, the action enabling task completion.

11. The computer storage media of claim 5, further comprising an advertisement display area that displays text or display advertisements for a particular entity.

12. The computer storage media of claim 5, further comprising a search history display area that displays a set of queries issued by the user and entities corresponding to the set of queries, the entities enabling the user to interact with a search history.

13. The computer storage media of claim 12, further comprising a social network display area that displays a topic shared by one or more users via a social network, the topic representing a set of queries issued by the one or more users and characterized by metadata associated with the at least one entity.

14. The computer storage media of claim 12, further comprising a multi-user history display area that displays a set of entities corresponding to a set of most popular searched for entities over a predetermined period of time by a population of users.

15. The computer storage media of claim 5, further comprising an annotated query display area that displays an annotated query with a set of previously identified entities for the query.

16. The computer storage media of claim 5, further comprising an annotated entity display area displays an annotated entity with a set of previously identified metadata for the entity.

17. A system for providing non-committal intent preview, disambiguation, and refinement of a search comprising:

one or more processors coupled to a computer storage medium, the computer storage medium having stored thereon a plurality of computer software components executable by the processor, the computer software components comprising:

an autosuggest component that receives a search prefix comprising one or more characters associated with an unexecuted search query and suggests one or more intent suggestions to a user;

an entity identification component that for each of the one or more intent suggestions, receives one or more entity identifications associated with each of the one or more intent suggestions;

a metadata component that retrieves metadata from an entity data store, the metadata corresponding to at least one entity associated with the one or more entity identifications;

a preview component that, without retrieving search results for the unexecuted search query, provides an aggregated intent preview based on the retrieved metadata corresponding to the at least one entity;

a refinement component that, without retrieving search corresponding to the unexecuted search query or a refinement request, provides a refined intent preview that refines the intent of the unexecuted search query and is associated with metadata corresponding to one or more subentities based on a selected item of metadata associated with the one or more entities; and an action component that, upon receiving an indication the user is satisfied the intent of the search query has been identified, executes the search query.

18. The system of claim 17, further comprising a ranking component that ranks the one or more entities based on entity-intrinsic signals, query-entity interactions by users, and query pattern likelihood scores, the query likelihood pattern scores based on expected patterns based on entity type, quality standards independent of an individual entity, quality standards independent of associated queries, dominance of one particular entity over another, and non-entity associations of the query.

19. The system of claim 17, further comprising an action component that enables task completion for a selected entity or subentity.

* * * * *